United States Patent
Sevastyanov et al.

(10) Patent No.: US 12,231,909 B2
(45) Date of Patent: Feb. 18, 2025

(54) CONFIGURATION OF ROUTING AREAS WITHIN AN AREA OF INTEREST

(71) Applicant: AT&T Intellectual Property I, L.P., Atlanta, GA (US)

(72) Inventors: Vladimir Sevastyanov, Fort Worth, TX (US); Abhay Dabholkar, Allen, TX (US); James Pratt, Round Rock, TX (US); Rakhi Gupta, Frisco, TX (US); Nikhlesh Agrawal, McKinney, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 234 days.

(21) Appl. No.: 17/731,293

(22) Filed: Apr. 28, 2022

(65) Prior Publication Data
US 2023/0354051 A1    Nov. 2, 2023

(51) Int. Cl.
H04W 16/18    (2009.01)
H04W 4/021    (2018.01)
H04W 40/20    (2009.01)

(52) U.S. Cl.
CPC ........... *H04W 16/18* (2013.01); *H04W 4/021* (2013.01); *H04W 40/205* (2013.01)

(58) Field of Classification Search
CPC .... H04W 16/18; H04W 4/021; H04W 40/205
See application file for complete search history.

(56) References Cited

U.S. PATENT DOCUMENTS

| | | | | |
|---|---|---|---|---|
| 6,229,921 B1 * | 5/2001 | Wenzel | ................... | G06T 7/223 382/209 |
| 8,654,672 B1 * | 2/2014 | Nicholas | .................. | H04Q 1/20 703/22 |
| 2004/0224577 A1 * | 11/2004 | Kaji | ........................ | B63B 79/40 440/1 |
| 2013/0183961 A1 * | 7/2013 | Bassiri | .................. | H04W 16/20 455/446 |
| 2018/0060476 A1 * | 3/2018 | Kasch | ................... | G06F 30/392 |
| 2018/0352309 A1 * | 12/2018 | Hopcraft | ............... | H04L 41/145 |
| 2020/0100521 A1 * | 4/2020 | Fishter | ...................... | A23F 5/38 |
| 2024/0114350 A1 * | 4/2024 | Nakahira | ............... | H04W 16/22 |

* cited by examiner

*Primary Examiner* — Myron Wyche
(74) *Attorney, Agent, or Firm* — Hartman & Citrin LLC

(57) ABSTRACT

Improving configuration of routing areas within an area of interest can include obtaining input data including a list of common language location identifiers within a defined area of interest and identification of a number of routing areas to be created within the area of interest; creating a bounding rectangle around the area of interest represented by the list of common language location identifiers; generating, within the bounding rectangle, a uniformly distributed sequence point; determining, from within the list of common language location identifiers, if the uniformly distributed sequence point is located in a particular common language location identifier of the list of common language location identifiers; if so, adding, to a list of kernel common language location identifiers the uniformly distributed sequence point; and if not, discarding the uniformly distributed sequence point.

20 Claims, 14 Drawing Sheets

CONFIGURATION OF ROUTING AREAS WITHIN AN AREA OF INTEREST

BACKGROUND

Network operators and providers have been faced with complex issues in planning their service of networks in various geographic areas. To address the complexity of this issue, some network operators rely on territory optimization to attempt to align service demand and capacity supply to provide the best possible outcomes such as quality of customer service, reduced driving time, reduced service expenses, customer churn, and other service-related issues. Territory optimization may be done manually (e.g., using spreadsheets), but aside from being a long and complicated process, the results from this manual approach may be known to be cumbersome and ineffective.

To address these and other shortcomings of manual territory optimization, solutions to spatial optimization problems have been created to attempt to develop automated redistricting approaches based on concepts such as clustering, location-allocation, space partitioning, integer programming, graph partitioning, genetic algorithms, Tabu search, and simulated annealing. Because geographic districting is a nondeterministic polynomial-time complete ("NP-complete") problem, no method can be guaranteed to find the best solution unless the problem is very small, for which an exhaustive search is possible.

Thus, current spatial optimization software tools that practitioners commonly use rely entirely on a manual approach, with which the user has to optimize the redistricting criteria with a trial-and-error approach. With such approaches, even expert users will need days or even weeks to manually construct a districting solution, which still may not be of sufficient quality in terms of satisfying all criteria and constraints. Accordingly, unique challenges exist associated with spatial optimization without the complexity experienced by existing techniques.

SUMMARY

The present disclosure is directed to improving configuration of routing areas within an area of interest. A telecommunications provider, network operator, and/or other entity may divide a network into geographic regions such as West, Midwest, Southwest, Southeast, Northeast, etc. Each of these regions may be split into one or more areas of interest (a portion of the region). Each area of interest can be divided into one or more routing area, with each routing area being made up of and/or encompassing one or more common language location identifiers (often referred to as "CLLIs"). Each of the common language location identifiers can have permanent geographic boundaries. As used herein, the common language location identifiers correspond to and represent a minimum portion or fragment of the territory associated with the network.

Embodiments of the concepts and technologies disclosed herein include solving an optimization problem in the field of geo configuration design with respect to an objective function and constraints combined from key performance indicators for such geo configuration design such as, for example, driving time for service calls in the routing area, time to resolve a ticket in the routing area, the open time for tickets in the routing area, other key performance indicators, or the like. The disclosed optimization problem solution can deliver a quick and higher-quality geo configuration design for any size of geo area from dozens of routing areas (e.g., the area of interest level) to hundreds of routing areas (e.g., the region level). It should be understood that these examples are illustrative, and therefore should not be construed as being limiting in any way.

As used herein, an "area of interest" can be used to refer to a geographic area that is covered by a particular list of routing areas. As used herein, a "routing area" can be used to refer to a geographic area (within the area of interest) that is covered by a particular list of common language location identifiers. Routing areas can be subsets of an area of interest, meaning all common language location identifiers in a routing area may be part of an area of interest, but all common language location identifiers in the area of interest are not necessarily all part of one routing area. As used herein, a "geo configuration" can refer to how the list of area of interest common language location identifiers are split into one or more sets of common language location identifiers, which can correspond to the one or more routing areas. It should be understood that these definitions are used in some example embodiments and therefore are illustrative and should not be construed as being limiting in any way.

Based on the above-noted hierarchy, wherein a region includes one or more area of interest; an area of interest includes one or more routing area; and a routing area includes one or more common language location identifiers; a telecommunications company or other network operator or owner can create a service center in each routing area, with each routing area therefore having a garage and a service team with one or more technicians. The number of technicians in a team can depend on the routing area size and local job density and can be in the range from one to seventy. The location of the service center in the routing area and the number and identity of the common language location identifiers included in the routing area can affect key performance indicators such as, for example, average driving distance, jobs completed, hours per completion, overtime, total cost, etc. In other words, the geo configuration of the routing area can impact service expenses and service quality.

Embodiments of the concepts and technologies disclosed herein can use a combinatorial optimization algorithm to initiate creation of a new geo configuration during each iteration of the algorithm and can optimize the geo configuration over several iterations of the algorithm. Embodiments of the concepts and technologies disclosed herein can include a simulation model that can allow the estimation of key performance indicators for a given geo configuration, the ability to randomly generate different geo configurations for a given area of interest, and the ability to identify a geo configuration with improved key performance indicator values compared with a previous and/or current geo configuration. These and other aspects of the concepts and technologies disclosed herein will be illustrated and described in more detail herein.

According to one aspect of the concepts and technologies disclosed herein, a system is disclosed. The system can include a processor and a memory. The memory can store computer-executable instructions that, when executed by the processor, cause the processor to perform operations. The operations can include obtaining input data including a list of common language location identifiers within a defined area of interest and identification of a number of routing areas to be created within the area of interest; creating a bounding rectangle around the area of interest represented by the list of common language location identifiers; generating, within the bounding rectangle, a uniformly distributed sequence point; determining, from within the list of common language location identifiers, if the uniformly distributed sequence point is located in a particular common language location identifier of the list of common language location identifiers; if a determination is made that the uniformly distributed sequence point is located in the particular common language location identifier, adding, to a list of kernel common language location identifiers, the uniformly distributed sequence point; and if a determination is made that the uniformly distributed sequence point is not located in the particular common language location identifier, discarding the uniformly distributed sequence point.

In some embodiments, the uniformly distributed sequence can be generated using a randomly distributed sequence. In some embodiments, the uniformly distributed sequence can be generated using a Sobol sequence. In some embodiments, the uniformly distributed sequence can be generated using a Latins square design sequence. In some embodiments, the uniformly distributed sequence can be generated using a randomized block designs sequence. In some embodiments, the computer-executable instructions, when executed by the processor, can cause the processor to perform operations further including creating a routing area list for a kernel common language location identifier; identifying, in the list of common language location identifiers within the defined area of interest, k-order neighbors for each common language location identifier taken from the given set of kernel common language location identifiers; appending, based on a neighborhood relationship, identified k-order neighbors to the routing area list for the kernel common language location identifiers; removing, from the list of common language location identifiers within the defined area of interest, appended common language location identifiers; and outputting the routing area list of common language location identifiers as a resulting geo configuration. In some embodiments, the computer-executable instructions, when executed by the processor, can cause the processor to perform operations further including estimating an objective function and constraints based on a simulation model applied to the geo configuration.

According to another aspect of the concepts and technologies disclosed herein, a method is disclosed. The method can include obtaining, by a computer including a processor, input data including a list of common language location identifiers within a defined area of interest and identification of a number of routing areas to be created within the area of interest; creating, by the processor, a bounding rectangle around the area of interest represented by the list of common language location identifiers; generating, by the processor and within the bounding rectangle, a uniformly distributed sequence point; determining, by the processor and from within the list of common language location identifiers, if the uniformly distributed sequence point is located in a particular common language location identifier of the list of common language location identifiers; if a determination is made that the uniformly distributed sequence point is located in the particular common language location identifier, adding, by the processor and to a list of kernel common language location identifiers, the uniformly distributed sequence point; and if a determination is made that the uniformly distributed sequence point is not located in the particular common language location identifier, discarding, by the processor, the uniformly distributed sequence point.

In some embodiments, the uniformly distributed sequence can be generated using a randomly distributed sequence. In some embodiments, the uniformly distributed sequence can be generated using a Sobol sequence. In some embodiments, the uniformly distributed sequence can be generated using a Latins square design sequence. In some embodiments, the uniformly distributed sequence can be generated using a randomized block designs sequence. In some embodiments, the method further can include creating a routing area list for a kernel common language location identifier; identifying, in the list of common language location identifiers within the defined area of interest, k-order neighbors for each common language location identifier taken from the given set of kernel common language location identifiers; appending, based on a neighborhood relationship, identified k-order neighbors to the routing area list for the kernel common language location identifiers; removing, from the list of common language location identifiers within the defined area of interest, appended common language location identifiers; and outputting the routing area list of common language location identifiers as a resulting geo configuration. In some embodiments, the method further can include estimating an objective function and constraints based on a simulation model applied to the geo configuration.

According to yet another aspect of the concepts and technologies disclosed herein, a computer storage medium is disclosed. The computer storage medium can store computer-executable instructions that, when executed by a processor, cause the processor to perform operations. The operations can include obtaining input data including a list of common language location identifiers within a defined area of interest and identification of a number of routing areas to be created within the area of interest; creating a bounding rectangle around the area of interest represented by the list of common language location identifiers; generating, within the bounding rectangle, a uniformly distributed sequence point; determining, from within the list of common language location identifiers, if the uniformly distributed sequence point is located in a particular common language location identifier of the list of common language location identifiers; if a determination is made that the uniformly distributed sequence point is located in the particular common language location identifier, adding, to a list of kernel common language location identifiers, the uniformly distributed sequence point; and if a determination is made that the uniformly distributed sequence point is not located in the particular common language location identifier, discarding the uniformly distributed sequence point.

In some embodiments, the uniformly distributed sequence can be generated using a randomly distributed sequence. In some embodiments, the uniformly distributed sequence can be generated using a Sobol sequence. In some embodiments, the uniformly distributed sequence can be generated using a Latins square design sequence. In some embodiments, the uniformly distributed sequence can be generated using a randomized block designs sequence. In some embodiments, the computer-executable instructions, when executed by the processor, can cause the processor to perform operations further including creating a routing area list for a kernel common language location identifier; identifying, in the list of common language location identifiers within the defined area of interest, k-order neighbors for each common language location identifier taken from the given set of kernel common language location identifiers; appending, based on a neighborhood relationship, identified k-order neighbors to the routing area list for the kernel common language location identifiers; removing, from the list of common language location identifiers within the defined area of interest, appended common language location identifiers; and outputting the routing area list of common language location identifiers as a resulting geo configuration. In some embodiments, the computer-executable instructions, when executed by the processor, can cause the processor to perform operations further including estimating an objective function and constraints based on a simulation model applied to the geo configuration.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
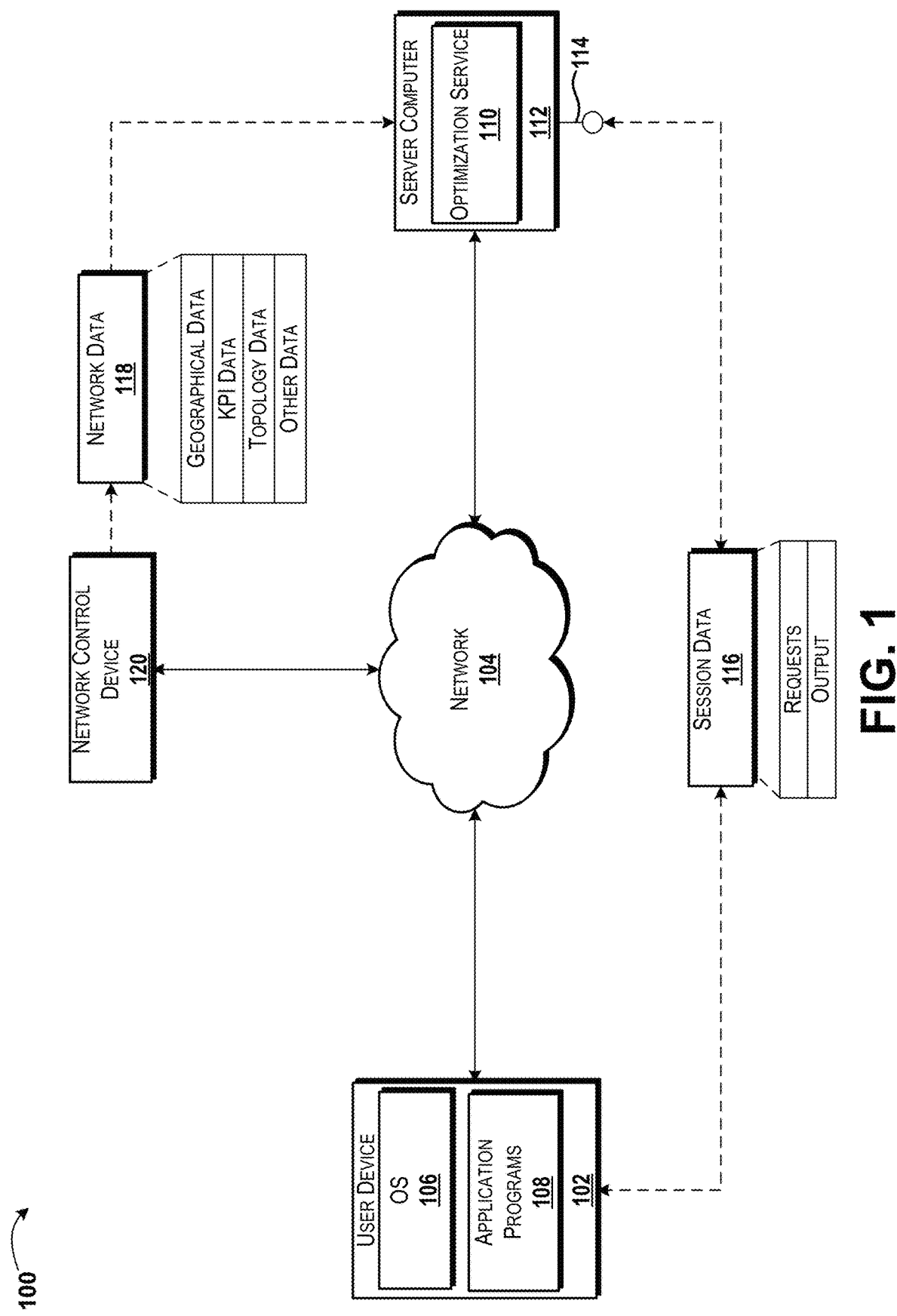
FIG. 1 is a system diagram illustrating an illustrative operating environment for various embodiments of the concepts and technologies described herein.

The following detailed description is directed to improving configuration of routing areas within an area of interest. Input data can be obtained for an area of interest optimization. The input data can include, but is not limited to, a list of one or more (and in some embodiments all) common language location identifiers within an area of interest and a number of routing areas to exist within the area of interest. A bounding rectangle can be created around the area of interest. The bounding rectangle can be sized such that it includes, within its area, a geographic area corresponding to the list of common language location identifiers. A variable can also be initialized to track a number of kernel common language location identifiers for the area of interest. It should be understood that these examples are illustrative, and therefore should not be construed as being limiting in any way.

A current number of kernel common language location identifiers can be examined to determine if the number exceeds the number of routing areas. If the current number of kernel common language location identifiers does not exceed the number of routing areas, a uniformly distributed sequence point can be generated within the bounding rectangle. The uniformly distributed sequence point can be generated using various approaches including, but not limited to, a sequence of random points; a Sobol sequence of points; a Latins square design sequence of points; a randomized block design; other designs, or the like. The uniformly distributed sequence point may be generated in a white space of the area of interest, in a common language location identifier within the area of interest, or the like.

If the uniformly distributed sequence point does not belong to a common language location identifier included in the list of common language location identifiers, the point can be discarded and a new uniformly distributed sequence point can be generated. If the uniformly distributed sequence point is within an existing common language location identifier, the uniformly distributed sequence point can be saved as a kernel common language location identifier, the number of kernel common language location identifiers can be incremented by one, and this can be repeated until a number of common language location identifiers exceeds the number of routing areas, at which point a list of kernel common language location identifiers can be output.

A complete list of all common language location identifiers for an area of interest being considered and a list of kernel common language location identifiers can be loaded and a number of routing areas being created can be determined. Also, a neighbor order variable can be set to two and a kernel common language location identifier variable can be set to one. Any k-order neighboring common language location identifiers to the kernel common language location identifier being considered can be added to a routing area with the kernel common language location identifier and those neighboring common language location identifiers can be removed from the list of all common language location identifiers for the area of interest. If the list of common language location identifiers is not empty, e.g., if all common language location identifiers have not been assigned to a routing area, a kernel number can be incremented so that a next kernel common language location identifier can be selected and/or analyzed. If the kernel number exceeds a number of routing areas to be created, the neighboring order number can be incremented, the kernel number can be decremented, and flow can repeat until the list of area of interest common language location identifiers is empty, e.g., that all common language location identifiers have been assigned to a routing area. A list of routing areas and the common language location identifiers associated with each of the routing areas can be output.

A baseline geo configuration can be loaded and designated as the "best configuration," and a maximum number of iterations for the optimization can be set. If the maximum number of iterations has not been exceeded, a new geo configuration for the area of interest can be randomly generated. The performance of the randomly generated geo configuration can be analyzed using a simulation model to calculate the performance using (and optimizing) one, two or more, and/or all key performance indicators (e.g., one or more of driving time, time to ticket resolution, delay to ticket action, etc.) for the new configuration. If the objective function value of the new configuration is better than the objective function value of the current configuration, the new configuration can be determined to be better than the previously used configuration. This process can be iterated until a maximum number of iterations have occurred and the best configuration can be output for use.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for improving configuration of routing areas within an area of interest will be described, according to an illustrative embodiment. The operating environment 100 shown in FIG. 1 includes a user device 102. The user device 102 can operate in communication with and/or as a part of a communications network ("network") 104, though this is not necessarily the case in all embodiments.

According to various embodiments, the functionality of the user device 102 may be provided by one or more server computers, desktop computers, mobile telephones, laptop computers, other computing systems, and the like. It should be understood that the functionality of the user device 102 may be provided by a single device, by two or more similar devices, and/or by two or more dissimilar devices. For purposes of describing the concepts and technologies disclosed herein, the user device 102 is described herein as a personal computer. It should be understood that this embodiment is illustrative and should not be construed as being limiting in any way.

The user device 102 can execute an operating system 106 (labeled "OS 106" in FIG. 1) and one or more application programs 108. The operating system 106 can include a computer program that can control the operation of the user device 102. The application programs 108 can include any number of executable programs that can be configured to execute on top of the operating system 106 to provide various functions. According to various embodiments, the application programs 108 can include web browsers, native applications, utilities, combinations thereof, or the like. Because other applications can provide the functionality of the application programs 108, it should be understood that these examples are illustrative, and therefore should not be construed as being limiting in any way.

According to various embodiments, the user device 102 can be configured (e.g., via execution of one or more of the application programs 108) to communicate with an optimization service 110. The optimization service 110 can be hosted and/or executed by a computing device such as, for example, the server computer 112. According to various embodiments, the functionality of the server computer 112 may be provided by one or more real or virtual server computers, virtual machines, web servers, application servers, desktop computers, laptop computers, other computing systems, and the like. It should be understood that the functionality of the server computer 112 may be provided by a single device, by two or more similar devices, and/or by two or more dissimilar devices. For purposes of describing the concepts and technologies disclosed herein, the server computer 112 is described herein as a web server that executes and/or hosts an application or service that is accessed by at least one of the application programs 108, namely the optimization service 110 illustrated and described herein. It should be understood that this embodiment is illustrative and should not be construed as being limiting in any way.

In the illustrated embodiment, the user device 102 (or other user or entity) can access the server computer 112 via one or more portals, application programming interfaces ("APIs"), or other functionality (hereinafter collectively and/or generically referred to as a "portal 114"). In the illustrated embodiment, the server computer 112 can be configured to expose the functionality of the optimization service 110 to one or more entities that request or call the functionality of the optimization service 110, for example a user device 102 or other user or entity via the portal 114. In some embodiments, the portal 114 can be accessed via a web-based portal and one or more authentication operations may be required before enabling such access in some embodiments. It should be understood that this example is illustrative, and therefore should not be construed as being limiting in any way.

In various embodiments, the server computer 112 can be configured (e.g., via execution of the optimization service 110) to generate, and/or to exchange with the user device 102, session data 116. Similarly, in various embodiments the session data 116 can be generated by the user device 102 and exchanged with the server computer 112. Thus, it can be appreciated that the session data 116 can correspond to data exchanged between the server computer 112 and the user device 102 during a session. It should be understood that this example is illustrative, and therefore should not be construed as being limiting in any way.

The session data 116 can include, for example, data associated with a network optimization session (e.g., a requested operation to optimize configuration of an area of interest). According to various embodiments, the session data 116 can include any data exchanged between the user device 102 and the server computer 112 during the session such as one or more requests (for optimization of the area of interest), data defining the area of interest (e.g., boundaries of the area of interest, identification of a country, region, state, county, city, ZIP code, or the like), UI data for presentation at one or more devices, one or more selections (e.g., selections and/or user input entered via a portal, command prompt, the UI, or the like), other data (e.g., session setup communications, passwords, logins, other data, or the like), combinations thereof, or the like.

The requests can include, for example, a request from the user device 102 for information relating to configuration of the network 104, a request to optimize placement of common language location identifiers in a particular routing area and/or area of interest, service calls or the like for invoking the optimization service 110, and/or other requests. In some embodiments, the requests can be sent to the server computer 112 by the user device 102 via one or more network connections such as via the network 104 and/or a networked environment. In some other embodiments, the requests can be "sent" to the server computer 112 via the portal 114 or other functionality, for example via a web page or the like, which can be provided to the user device 102 via the session data 116 in some embodiments. Because the requests can be received by the server computer 112 in additional and/or alternative manners, it should be understood that these examples are illustrative, and therefore should not be construed as being limiting in any way.

According to various embodiments of the concepts and technologies disclosed herein, the optimization service 110 can be configured to develop and/or to improve a configuration of one or more routing areas within an area of interest. In particular, as will be illustrated and described in more detail hereinbelow, the optimization service 110 can be configured to provide what may be referred to as "geo design" for an area of interest such as a geographic area or region covered in part or whole by a communications network such as the network 104. "Geo design," as used herein, can be used to refer to identifying and/or modifying one or more routing areas within an area of interest, determining and/or allocating one or more common language location identifiers to and/or among the one or more routing areas, determining geographic locations for service centers in the one or more routing areas, combinations thereof, or the like. Because the geo design illustrated and described herein can include additional aspects of configuring the routing areas within an area of interest, it should be understood that these examples are illustrative, and therefore should not be construed as being limiting in any way.

According to various embodiments, the optimization service 110 can be configured to obtain one or more data points associated with the network 104 to provide the functionality illustrated and described herein. In various embodiments, the optimization service 110 can be configured to obtain network data 118 from a network control device 120 and/or other entity associated with the network 104 (or other networked environment). According to various embodiments, the network control device 120 can include and/or can access one or more network planning devices, orchestration devices, inventories, network monitors, and/or other devices and/or entities. The network control device 120 can be configured to capture, obtain, provide, and/or release one or more instances of network data 118 at various times, and the server computer 112 can receive and/or access the network data 118 at these and/or other times. It should be understood that this example is illustrative, and therefore should not be construed as being limiting in any way.

According to various embodiments, the network data 118 can define and/or describe a topology and/or configuration associated with the network 104 including, for example, one or more areas of interest, one or more routing areas within the one or more areas of interest, one or more common language location identifiers within the one or more routing areas, and/or other configuration and/or topology information. According to various embodiments of the concepts and technologies disclosed herein, the network control device 120 can be configured to release the network data 118 to the server computer 112 and/or to make the network data 118 available to one or more requestors such as, for example, the server computer 112. It should be understood that these example embodiments are illustrative, and therefore should not be construed as being limiting in any way.

According to various embodiments of the concepts and technologies disclosed herein, the network data 118 can include various network planning and/or operational information including, but not limited to, geographical data, key performance indicator data ("labeled KPI data" in FIG. 1), topology data, other data, combinations thereof, or the like. The geographical data can include various indicators of geographic location such as, for example, one or more common language location identifiers (also referred to as "CLLIs"), geographic coordinates, ZIP codes, boundaries (e.g., city boundaries, county boundaries, state boundaries, etc.), addresses, other geographic data, combinations thereof, or the like. In some embodiments, a common language location identifier can include at least a unique name and geographical coordinates in the form of a polygon that defines the boundaries of the common language location identifier.

In some embodiments, for example, the network data 118 can include all geographical data associated with the network 104 and/or associated with a particular area of interest. Thus, in some embodiments the geographical data can include geographic coordinates or other data that can specify or define one or more areas of interest, one or more routing areas, and/or one or more common language location identifiers.

In one contemplated embodiment, e.g., where the geographical data can include common language location identifiers, the geographical data can include non-geographic data (e.g., a unique name for the common language location identifier), which can be associated with geographical data in some embodiments. By way of example, a common language location identifier can be formatted, in some embodiments, as QWERTY123: POLYGON ((−90.1575 30.0205, −90.1572 30.0204, −90.1573 30.01879, −90.1573 30.01807, . . . −90.1600 30.0212, −90.1575 30.0205)), where the polygon is defined by joining the points located at the coordinate set including (−90.1575 30.0205), (−90.1572 30.0204), (−90.1573 30.01879), (−90.1573 30.01807), (−90.1600 30.0212), and (−90.1575 30.0205) and/or other points can define a polygon that encompasses the common language location identifier. Because other types of geographical data can be included in the network data 118, it should be understood that this example is illustrative, and therefore should not be construed as being limiting in any way.

The key performance indicator data can include one or more key performance indicators for a particular portion of the network 104. As used herein, the key performance indicator data relied on herein can relate to customer service issues such as, for example, an average driving distance within a routing area (e.g., the amount of time a service technician or repair technician would have to drive on average to service users in a particular routing area); a number of jobs completed within the routing area; a location of a service center in the routing area; hours per job completed by the service technicians in the routing area;

costs of repairs in the routing area; etc. In some embodiments, the key performance indicators can be obtained for the area of interest, the one or more routing areas in the area of interest, the one or more common language location identifiers that are included in and/or that make up the routing areas, combinations thereof, or the like. Thus, the network data 118 can provide data that can indicate performance of service technicians in a portion of the network 104. It should be understood that this example is illustrative, and therefore should not be construed as being limiting in any way.

The topology data can include information that can define various aspects of the network 104 such as, for example, one or more areas of interest, one or more routing areas, one or more common language location identifiers, and the like. Thus, the topology data can be analyzed to determine, among other things, a portion of the network 104 such as an area of interest that is to be optimized; one or more routing areas that are included in the area of interest; one or more common language location identifiers that make up one or more routing areas in the area of interest; and the like. The use of these and other data will be explained in additional detail hereinbelow.

The other data can include information defining, for example, white space in a particular area of interest (e.g., areas in which no routing area and/or common language location identifiers are defined); lakes; forests; and/or other areas that do not need to be serviced. The other data also can include, for example, data that defines trends and/or historical data for service issues, models and/or simulations, topologies and/or existing configurations, combinations thereof, or the like. Because the other data can include any other data as illustrated and described herein, it should be understood that this example is illustrative, and therefore should not be construed as being limiting in any way.

According to various embodiments, the optimization service 110 can obtain or receive the network data 118 and can be configured to determine, based on the network data 118, a configuration for a particular area of interest of the network 104. As used herein, the "configuration" for a particular area of interest of the network 104 can refer to the location of a service center(s) in an area of interest, one or more routing areas for a particular area of interest, and/or one or more common language location identifiers that are to be associated with and/or included in each of the routing areas of the area of interest.

According to various embodiments of the concepts and technologies disclosed herein, the optimization service 110 may obtain the network data 118 in response to receiving a request (e.g., from the user device 102 by way of the session data 116 illustrated and described herein). In some other embodiments, the optimization service 110 may be provided with the network data 118 by the network control device 120 at various times and/or for various reasons. Regardless of how and/or why the optimization service 110 receives the network data 118, the optimization service can be configured to optimize a configuration for an area of interest using the network data 118.

In particular, the optimization service 110 can obtain the network data 118 and/or other input data such as, for example, data defining an area of interest, data defining one or more routing areas in the area of interest, data defining one or more common language location identifiers that make up a particular routing area, combinations thereof, or the like. The optimization service 110 can be configured to initialize the data and perform one or more algorithms for optimizing the configuration of the area of interest. Upon iterating the algorithm to a defined maximum number of iterations, the optimization service can output a best configuration identified. In some embodiments a simulation can be used to test various configurations and an ideal configuration for the area of interest can be identified. These and other aspects of the concepts and technologies disclosed herein will be illustrated and described herein in more detail below.

In practice, the optimization service 110 can be executed by the server computer 112. The optimization service 110 can obtain input data (e.g., the network data 118) for an area of interest optimization. The input data can include, but is not limited to, a list of one or more (and in some embodiments all) common language location identifiers within an area of interest and a number of routing areas to exist within the area of interest. A bounding rectangle can be created around the area of interest. The bounding rectangle can be sized such that it includes, within its area, a geographic area corresponding to the list of common language location identifiers. A variable can also be initialized to track a number of kernel common language location identifiers for the area of interest. It should be understood that these examples are illustrative, and therefore should not be construed as being limiting in any way.

A current number of kernel common language location identifiers can be examined to determine if the number exceeds the number of routing areas. If the current number of kernel common language location identifiers does not exceed the number of routing areas, a uniformly distributed sequence point can be generated within the bounding rectangle. The uniformly distributed sequence point can be generated using various approaches including, but not limited to, a sequence of random points; a Sobol sequence of points; a Latins square design sequence of points; a randomized block design; other designs, or the like. The uniformly distributed sequence point may be generated in a white space of the area of interest, in a common language location identifier within the area of interest, or the like.

If the uniformly distributed sequence point does not belong to a common language location identifier included in the list of common language location identifiers, the point can be discarded and a new uniformly distributed sequence point can be generated. If the uniformly distributed sequence point is within an existing common language location identifier, the uniformly distributed sequence point can be saved as a kernel common language location identifier, the number of kernel common language location identifiers can be incremented by one, and this can be repeated until a number of common language location identifiers exceeds the number of routing areas, at which point a list of kernel common language location identifiers can be output.

A complete list of all common language location identifiers for an area of interest being considered and a list of kernel common language location identifiers can be loaded and a number of routing areas being created can be determined. Also, a neighbor order variable can be set to two and a kernel common language location identifier variable can be set to one. Any k-order neighboring common language location identifiers to the kernel common language location identifier being considered can be added to a routing area with the kernel common language location identifier and those neighboring common language location identifiers can be removed from the list of all common language location identifiers for the area of interest. If the list of common language location identifiers is not empty, e.g., if all common language location identifiers have not been assigned to a routing area, a kernel number can be incremented so that a next kernel common language location identifier can be selected and/or analyzed. If the kernel number exceeds a number of routing areas to be created, the neighboring order number can be incremented, the kernel number can be decremented, and flow can repeat until the list of area of interest common language location identifiers is empty, e.g., that all common language location identifiers have been assigned to a routing area. A list of routing areas and the common language location identifiers associated with each of the routing areas can be output.

A baseline geo configuration can be loaded and designated as the "best configuration," and a maximum number of iterations for the optimization can be set. If the maximum number of iterations has not been exceeded, a new geo configuration for the area of interest can be randomly generated. The performance of the randomly generated geo configuration can be analyzed using a simulation model to calculate the performance using (and optimizing) one, two or more, and/or all key performance indicators (e.g., one or more of driving time, time to ticket resolution, delay to ticket action, etc.) for the new configuration. If the objective function value of the new configuration is better than the objective function value of the current configuration, the new configuration can be determined to be better than the previously used configuration. This process can be iterated until a maximum number of iterations have occurred and the best configuration can be output for use.

FIG. 1 illustrates one user device 102, one network 104, one server computer 112, and one network control device 120. It should be understood, however, that various implementations of the operating environment 100 can include zero, one, or more than one user device 102; zero, one, or more than one network 104; zero, one, or more than one server computer 112; and/or zero, one, or more than one network control device 120. As such, the illustrated embodiment should be understood as being illustrative, and should not be construed as being limiting in any way.

Figure 2:
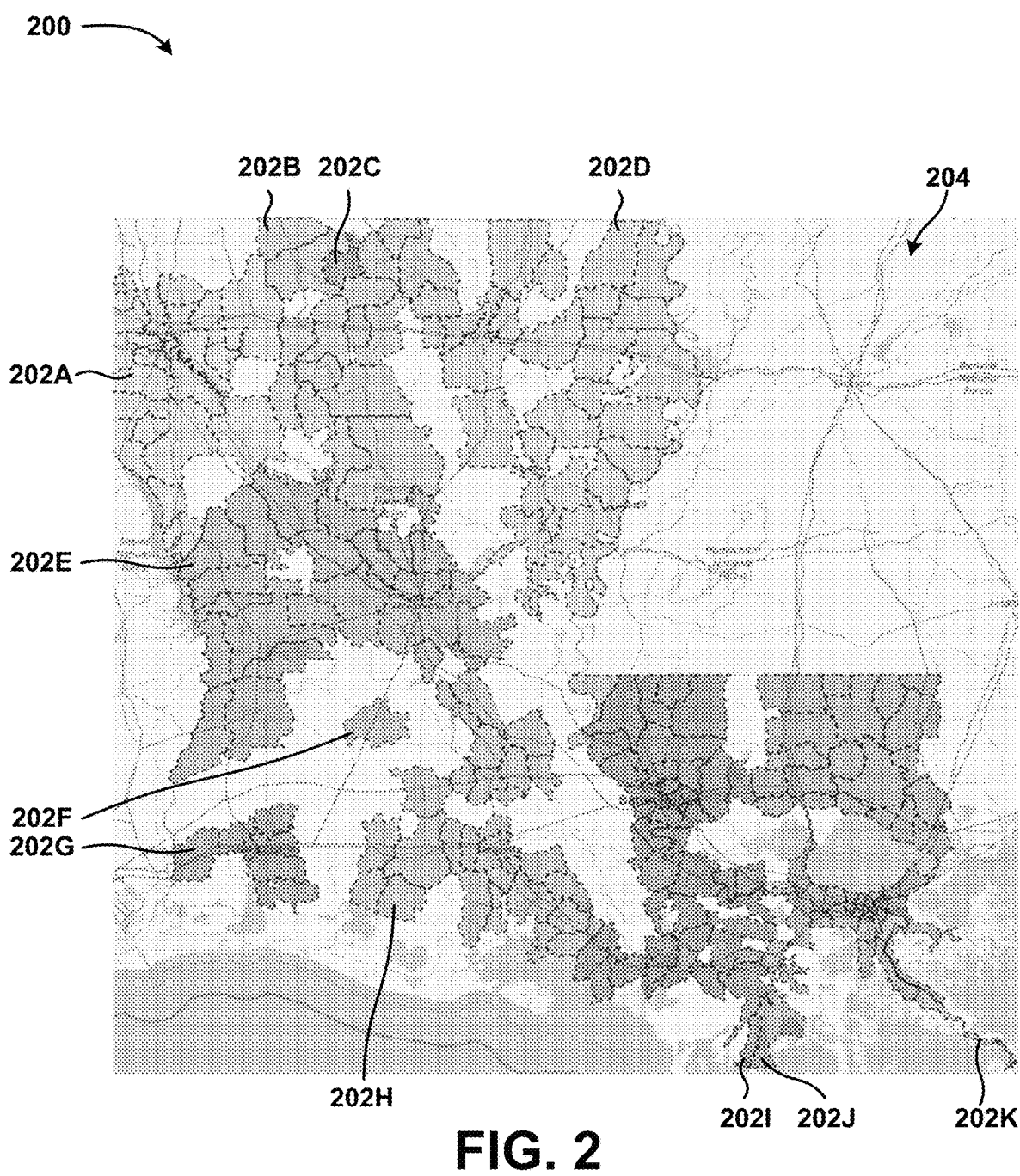
FIG. 2 is a line drawing illustrating additional aspects of some embodiments of the concepts and technologies disclosed herein.

FIG. 2 is a line drawing illustrating aspects of the concepts and technologies disclosed herein. In particular, FIG. 2 is an example map display 200 for an example area of interest. In the illustrated example embodiment, the area of interest corresponds to the state of Louisiana. It should be understood that this example is illustrative, and therefore should not be construed as being limiting in any way.

As can be seen in FIG. 2, the map display 200 can include eleven routing areas 202A-K (hereinafter collectively and/or generically referred to as "routing areas 202"). As can be appreciated with reference to FIG. 2, the area of interest can include any number of routing areas 202. In some instances, the area of interest may be entirely defined and/or covered by one or more routing areas, while in some other instances, part of an area of interest may include white space 204, which can correspond to an area in which no routing area is associated. Although not visible in FIG. 2, each of the routing areas can be made up of one or more common language location identifiers. Thus, while white space 204 can exist outside of a routing area in some embodiments, some embodiments of the concepts and technologies disclosed herein do not include any white space 204 inside a routing area (e.g., a routing area may be covered in its entirety by one or more common language location identifiers). It should be understood that this example is illustrative, and therefore should not be construed as being limiting in any way.

Figure 3:
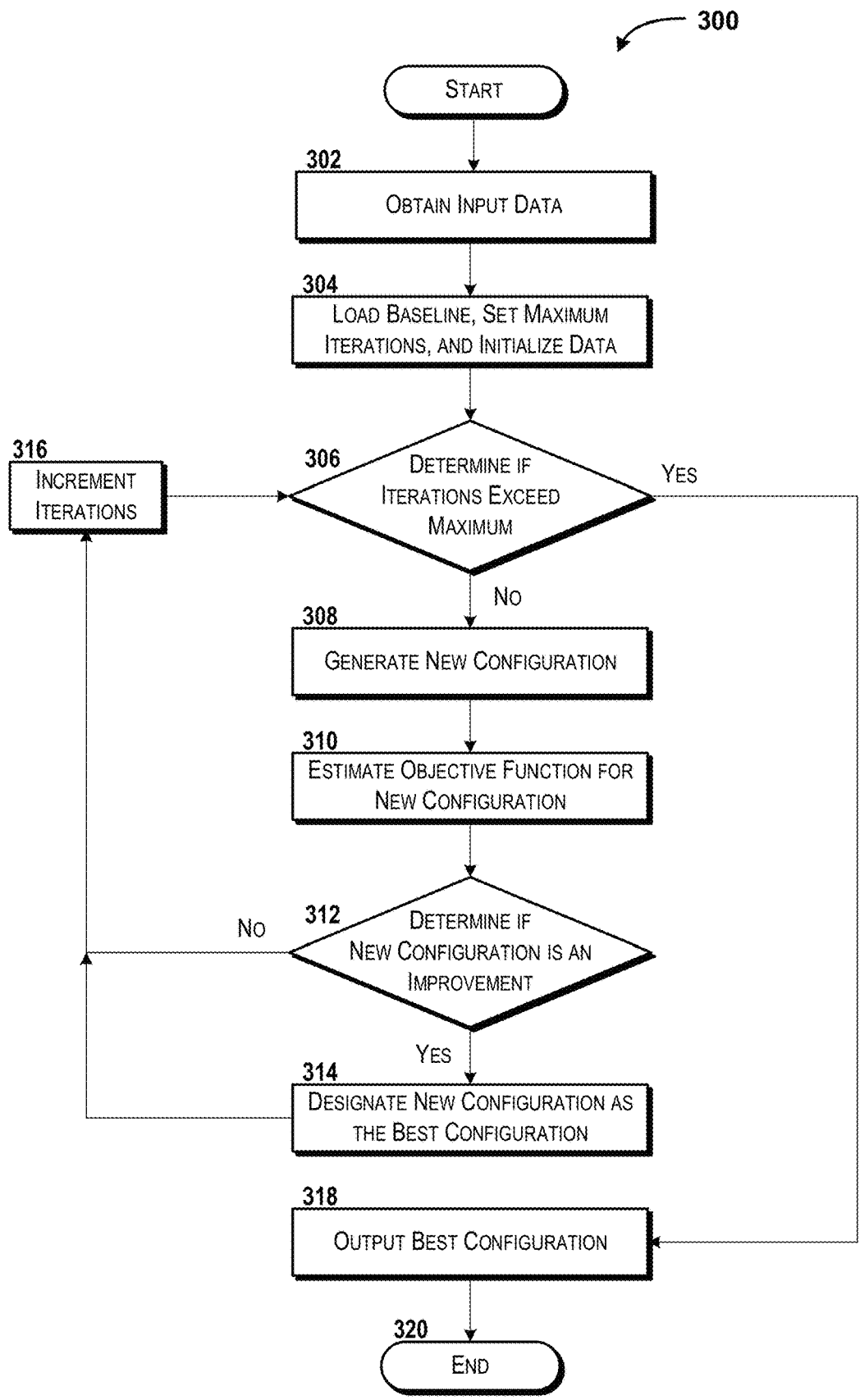
FIG. 3 is a flow diagram showing aspects of a method for optimizing a configuration of routing areas in an area of interest, according to an illustrative embodiment of the concepts and technologies described herein.

Turning now to FIG. 3, aspects of a method 300 for optimizing a configuration of routing areas in an area of interest will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 112, to perform one or more operations and/or causing the processor to direct other components of the computing system or device to perform one or more of the operations.

For purposes of illustrating and describing the concepts of the present disclosure, the various methods illustrated and described herein are described as being performed by the server computer 112 via execution of one or more software modules such as, for example, the optimization service 110. It should be understood that additional and/or alternative devices and/or network nodes can provide the functionality described herein via execution of one or more modules, applications, and/or other software including, but not limited to, the optimization service 110. Thus, the illustrated embodiments are illustrative, and should not be viewed as being limiting in any way.

The method 300 begins at operation 302. At operation 302, the server computer 112 can obtain input data such as, for example, the network data 118. According to various embodiments of the concepts and technologies disclosed herein, the input data (e.g., the network data 118) obtained in operation 302 can include a list of common language location identifiers included in a given area of interest and a required number of routing areas. It can be appreciated that a device that calls the functionality of the optimization service 110 and/or that submits a request to the optimization service 110 (and/or the server computer 112 that hosts and/or executes the optimization service 110) may identify the area of interest, the number of routing areas, and/or the common language location identifiers included in the area of interest. In some embodiments, the request or service call may only identify the area of interest. In yet other embodiments, the request or service call may identify the number of routing areas and the area of interest. Because the input data obtained in operation 302 can include additional and/or alternative information and/or data, it should be understood that these examples are illustrative, and therefore should not be construed as being limiting in any way.

From operation 302, the method 300 can proceed to operation 304. At operation 304, the server computer 112 can load a baseline configuration, designate the baseline configuration as the "best configuration," and set a maximum number of iterations for the optimization being performed in operation 304. In particular, the server computer 112 can load the baseline configuration for the area of interest, e.g., the current geo configuration being used in the area of interest of the network, and the configuration that is to be improved and/or optimized by way of the operations illustrated and described herein. This configuration may be known based on topology and/or inventory information included in the network data 118 and/or based on other information known to and/or accessible to the optimization service 110.

As noted above, operation 304 also can include setting a maximum number of iterations for the method 300. As will be more clearly understood below, some operations of the method 300 can be iterated in some embodiments until an optimal solution (e.g., configuration for the area of interest) is identified or until a particular number of iterations have been completed. The number of iterations to be completed can be based on knowledge that an absolute best solution may be difficult, impossible, or impractical to identify, but that the optimization of the configuration will, at some point, get close to the optimal solution with additional iterations providing modest if any improvement. Thus, calculations can be limited by the maximum number of iterations in some embodiments. In some embodiments, the maximum number of iterations may be set to ten, one hundred, one thousand, and/or other even or odd integers. Because the maximum number of iterations can be set to any number, it should be understood that these examples are illustrative, and therefore should not be construed as being limiting in any way.

In various embodiments of the concepts and technologies disclosed herein, operation 304 also can include a data initialization process. For example, the current number of iterations can be set to "0" in operation 304 and the current configuration can be loaded as noted above. Additionally, the key performance indicators for the baseline configuration can be obtained and/or calculated (e.g., driving time, ticket resolution time, etc.) and/or estimated, and an objective function value for the baseline configuration can be calculated or estimated. It should be understood that this example is illustrative, and therefore should not be construed as being limiting in any way.

From operation 304, the method 300 can proceed to operation 306. At operation 306, the server computer 112 can determine if a number of iterations exceeds a maximum number of iterations. It can be appreciated that a current iteration number can be maintained by the optimization service 110 and compared to the maximum number of iterations to provide the functionality of operation 306. In some embodiments of the concepts and technologies disclosed herein, the iteration number may be incremented before operation 306, although the illustrated embodiment shows the iteration being incremented later (as will be explained below). At any rate, unless the maximum number of iterations is set to one, operation 306 will be iterated at least two times in various embodiments illustrated and described herein. It should be understood that this example is illustrative, and therefore should not be construed as being limiting in any way.

If the server computer 112 determines, in operation 306, that the maximum number of iterations has not been exceeded, the method 300 can proceed to operation 308. At operation 308, the server computer 112 can randomly generate a new geo configuration for the area of interest. Additional details of generating the new geo configuration will be illustrated and described herein with reference to FIG. 6. Because the new geo configuration can be generated in additional and/or alternative manners, it should be understood that this example is illustrative, and therefore should not be construed as being limiting in any way.

From operation 308, the method 300 can proceed to operation 310. At operation 310, the server computer 112 can estimate the objective function of the new configuration randomly generated in operation 308. In some embodiments of the concepts and technologies disclosed herein, the server computer 112 can obtain or estimate one, two or more, and/or all key performance indicators (e.g., one or more of driving time, time to ticket resolution, delay to ticket action, etc.) for the new configuration. The server computer 112 can use these and/or other values to estimate the objective function of the new configuration in various embodiments. It should be understood that this example is illustrative, and therefore should not be construed as being limiting in any way.

From operation 310, the method 300 can proceed to operation 312. At operation 312, the server computer 112 can determine if the objective function estimated in operation 310 is better than the objective function value of the current configuration. It can be appreciated that in a first iteration of operation 312, the "current configuration" can correspond to the baseline configuration. As such, in a first iteration of operation 312, the objective function estimated in operation 310 can be compared to the objective function calculated for the baseline configuration in operation 304. It should be understood that this example is illustrative, and therefore should not be construed as being limiting in any way.

If the server computer 112 determines that the estimated objective function is better than the objective function calculated for the previously used geo configuration, the server computer 112 can determine that the new configuration randomly generated in operation 308 is better than the previously used configuration and flow of the method 300 can proceed to operation 314. At operation 314, the server computer 112 can designate the new configuration generated in operation 308 as the "best configuration" to be used in a future iteration. It should be understood that this example is illustrative, and therefore should not be construed as being limiting in any way.

From operation 314, the method 300 can proceed to operation 316. The method 300 also can proceed to operation 316 if the server computer 112 determines, in operation 312, that the new configuration is not an improvement over the previously used configuration (in which case, the configuration generated in operation 308 can be discarded or disregarded and the previously-used configuration can be maintained).

At operation 316, the server computer 112 can iterate the number of iterations and the method 300 can flow back to operation 306. Thus, it can be appreciated that operations 306-316 can be iterated until the server computer 112 determines, in any iteration of operation 306, that the current number of iterations exceeds a maximum number of iterations. If the server computer 112 determines, in any iteration of operation 306, that the maximum number of iterations has been exceeded, the method 300 proceeds to operation 318.

At operation 318, the server computer 112 can output the best configuration for the area of interest. By way of example, if the server computer 112 never determined (in any iteration of operation 312) that the new configuration being considered was an improvement over the baseline configuration (designated as the best configuration in operation 304), the server computer 112 can output the baseline configuration in operation 318. Otherwise, the server computer 112 can output, in operation 318, the best configuration evaluated in the one or more iterations of operations 306-316. Thus, operation 318 can result in the output of an optimized geo configuration for the area of interest. It should be understood that this example is illustrative, and therefore should not be construed as being limiting in any way.

From operation 318, the method 300 can proceed to operation 320. The method 300 can end at operation 320. In various embodiments of the concepts and technologies disclosed herein, the method 300 can be completed to optimize one or more key performance indicators for an area of interest being considered, and the method 300 can be iterated, in some embodiments, for each of the one or more key performance indicators to determine an optimized geo configuration. This process can be applied to some or all areas of interest in some or all regions, thereby realizing, in some embodiments, global geo design over the entire US territory and/or other geographic locations. It should be understood that this example is illustrative, and therefore should not be construed as being limiting in any way.

Figure 4A:
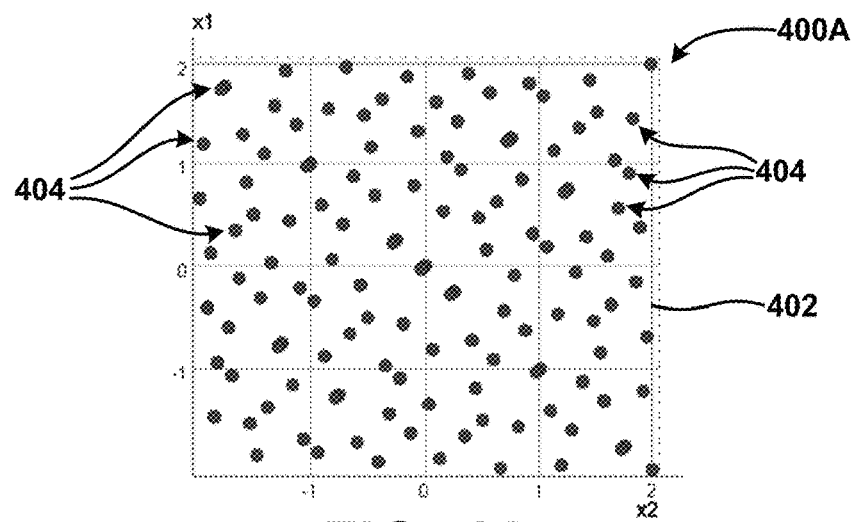
FIGS. 4A-4C are line drawings illustrating additional aspects of some embodiments of the concepts and technologies disclosed herein.
Figure 4B:
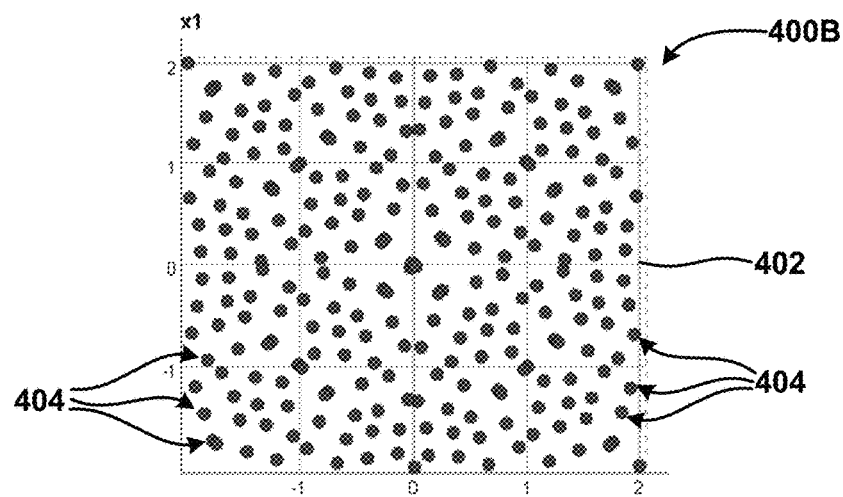
Figure 4C:
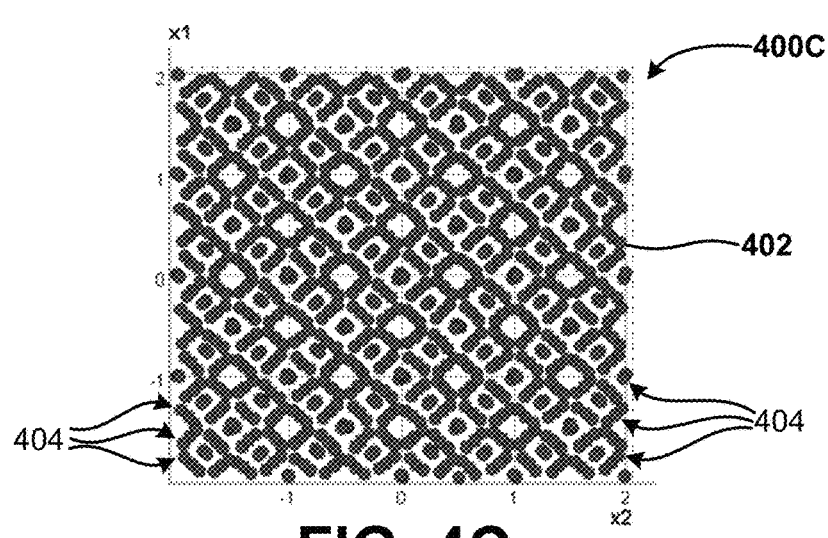

FIGS. 4A-4C are line drawings illustrating additional aspects of the concepts and technologies disclosed herein for improving configuration of routing areas within an area of interest. Turning first to FIG. 4A, an example of a scatterplot 400A is shown in accordance with embodiments of the concepts and technologies disclosed herein. The scatterplot 400A includes a bounding rectangle 402 that in this example defines boundaries for an area of interest and, within the area of interest in FIG. 4A, a uniformly distributed sequence of one hundred twenty-eight points 404 are shown (only some points 404 are labeled for clarity).

In FIG. 4B, a scatterplot 400B is illustrated as again including a bounding rectangle 402. In FIG. 4B, however, the scatterplot 400B includes two hundred fifty-six points 404. In FIG. 4C, a scatterplot 400C is illustrated as again including a bounding rectangle 402. In FIG. 4C, the scatterplot 400C includes one thousand twenty-four points 404. It can be appreciated with collective reference to FIGS. 4A-4C that as the number of points 404 increases, the distance between the points 404 decreases. As such, if the number of points 404 is increased and superimposed on a corresponding map of an area of interest, each common language location identifier in the map will be overlaid by at least one point 404 if the number of points 404 is increased to a sufficient level for the size of the area of interest. This will be clearer with reference to FIG. 5 below.

According to various embodiments of the concepts and technologies disclosed herein, different approaches to generating the uniformly distributed sequence of points can be used including, but not limited to, a sequence of random points; a Sobol sequence of points; a Latins square design sequence of points; a randomized block design; other designs, or the like. For purposes of illustration, FIGS. 4A-4C are illustrated in accordance with a Sobol sequence of points. It should be understood that this example is illustrative, and therefore should not be construed as being limiting in any way.

Figure 5:
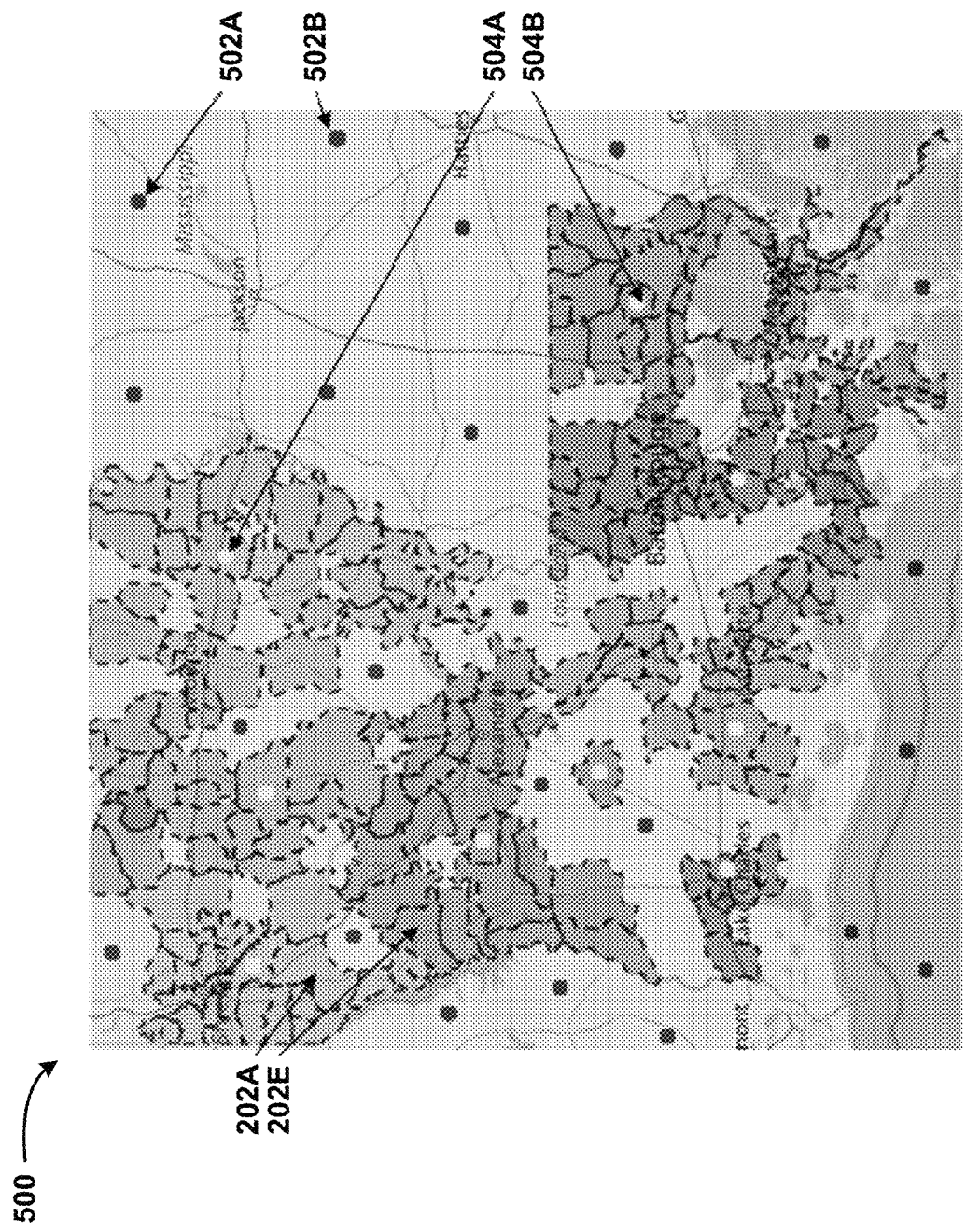
FIG. 5 is a line drawing illustrating additional aspects of some embodiments of the concepts and technologies disclosed herein.

FIG. 5 is a line drawing illustrating additional aspects of the concepts and technologies disclosed herein. In particular, FIG. 5 illustrates an example map display 500 that is used to illustrate a first state of a process for optimizing configuration of routing areas in an area of interest, according to one example embodiment of the concepts and technologies disclosed herein. It can be appreciated that the map display 500 of FIG. 5 is similar to the map display 200 illustrated in FIG. 2, including the routing areas 202 and white spaces 204, and the like. It should be understood that this example is illustrative, and therefore should not be construed as being limiting in any way.

FIG. 5 illustrates how a bounding rectangle can be placed around a given area of interest (e.g., the state of Louisiana in this example). This bounding rectangle can function as a workspace within which a uniformly distributed sequence of points can be generated, with each of the points having two projections, namely latitude and longitude coordinates (these coordinates can correspond to their relative location in the bounding rectangle, e.g., the location in the area of interest to which their placement corresponds). It should be understood that this example is illustrative, and therefore should not be construed as being limiting in any way.

Because each common language location identifier in the area of interest can be defined by a boundary that can include a set of latitude and longitude coordinates making a polygon, this relative location of the points can be used to determine if the associated points fall or do not fall in any common language location identifier. In particular, in FIG. 5 the map display 500 includes a uniformly distributed sequence of points, which in FIG. 5 include the non-intersecting points 502A-B (hereinafter collectively and/or generically referred to as "non-intersecting points 502") and the intersecting points 504A-B (hereinafter collectively and/or generically referred to as "intersecting points 504").

It can be appreciated with reference to FIG. 5 that the non-intersecting points 502 can correspond to points of a uniformly distributed sequence that are located at locations (within the area of interest bound by a bounding rectangle not visible in FIG. 5) that are not covered by any of the common language location identifiers, e.g., to locations that correspond to white space as illustrated and described herein. The intersecting points 504, on the other hand, can correspond to points of a uniformly distributed sequence that are located at locations (within the area of interest bound by a bounding rectangle not visible in FIG. 5) that are covered by one of the common language location identifiers. In the illustrated embodiment, the non-intersecting points 502 are illustrated in red and the intersecting points 504 are illustrated in yellow. It should be understood that this example is illustrative, and therefore should not be construed as being limiting in any way.

Thus, FIG. 5 illustrates how a uniformly distributed sequence of points can be generated and how the resulting points can be checked to determine if the points are located within boundaries of a common language location identifier or not. As the uniformly distributed set of points are created (e.g., as additional points are created), each point can be evaluated to determine if the point falls within the boundaries of a common language location identifier. If so, the point can be determined to be an intersecting point 504, and if not, the point can be determined to be a non-intersecting point 502. The non-intersecting points 502 can subsequently be ignored as they do not fall within the boundaries of any common language location identifier, and the intersecting points 504 can be used to identify common language location identifiers as kernel common language location identifiers and used as centers of new routing areas, as will be illustrated and described in more detail below.

Figure 6:
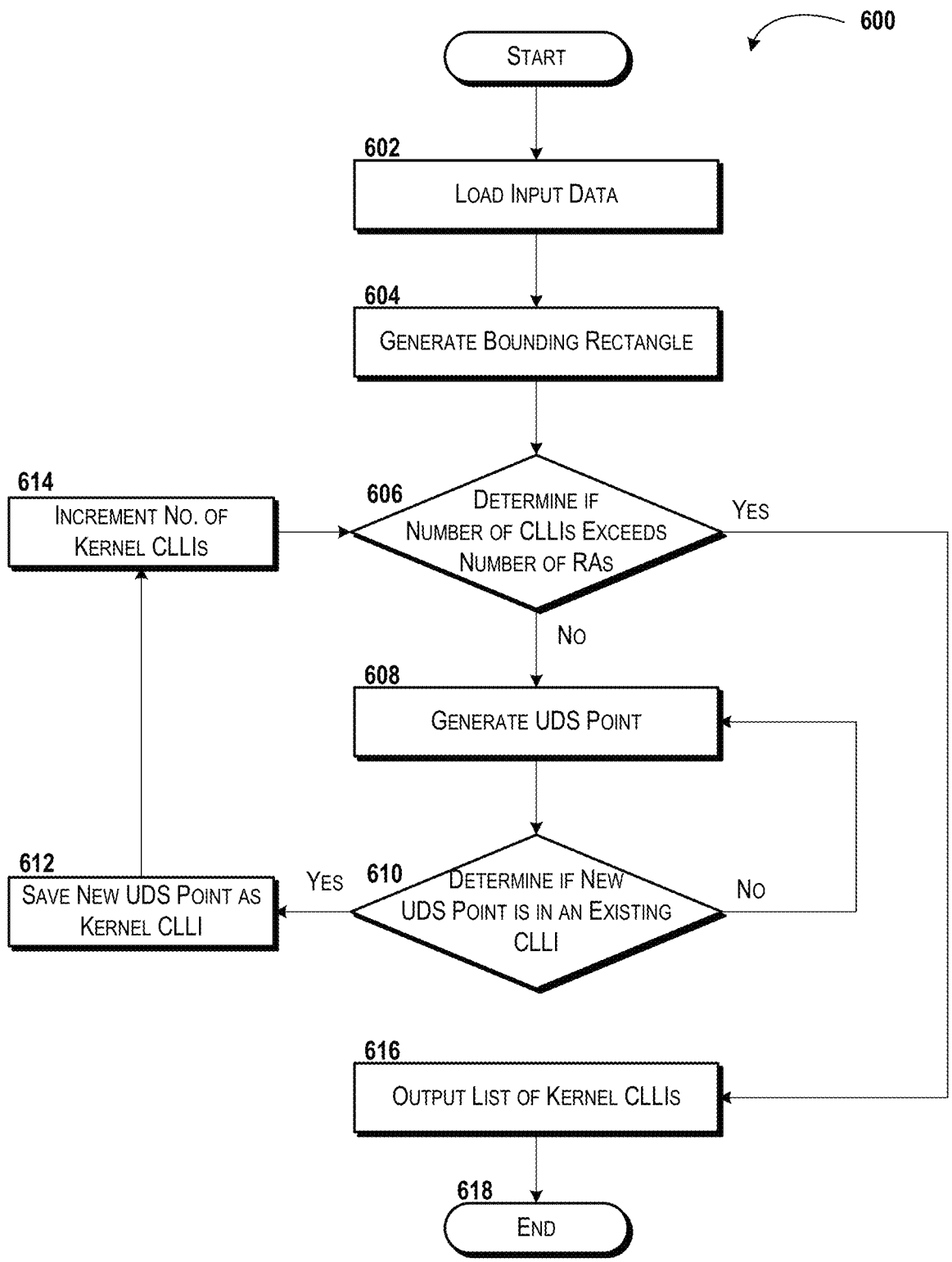
FIG. 6 is a flow diagram showing aspects of a method for identifying kernel common language location identifiers within an area of interest, according to an illustrative embodiment of the concepts and technologies described herein.

Turning now to FIG. 6, aspects of a method 600 for identifying one or more kernel common language location identifiers within an area of interest will be described in detail, according to an illustrative embodiment. The method 600 begins at operation 602. At operation 602, the server computer 112 can load input data. The input data can include, but is not limited to, a list of one or more (and in some embodiments all) common language location identifiers within an area of interest and identification of a number of routing areas within the area of interest. Thus, the area of interest can be defined by the list of common language location identifiers, and the number of routing areas that these common language location identifiers are to be divided into can be identified. In some embodiments, the number of routing areas to be created can be set by a user, by one or more configurations or settings, by random, and/or otherwise. It should be understood that this example is illustrative, and therefore should not be construed as being limiting in any way.

From operation 602, the method 600 can proceed to operation 604. At operation 604, the server computer 112 can generate a bounding rectangle around the area of interest as identified in operation 602. As noted herein, each common language location identifier can include geographic coordinates (e.g., latitude and longitude identifiers) for multiple points that, if joined by one or more lines or connectors can define a geographic area. Thus, in operation 604, the bounding box can be set such that it includes, within its area, all geographic areas corresponding to the list of common language location identifiers identified in operation 602. It therefore can be appreciated that unless the list of common language location identifiers corresponds to a square space, that some white space will be included within the bounding rectangle created in operation 604. It should be understood that this example is illustrative, and therefore should not be construed as being limiting in any way.

Operation 604 also can include, in some embodiments, a data initialization procedure or process. In various embodiments of operation 604, one or more variables or values can be set. For example, a number of routing areas to be included in the area of interest can be set. Also, a variable can be set to zero or another value and that variable can be incremented to track a number of kernel common language location identifiers for the area of interest. It should be understood that these examples are illustrative, and therefore should not be construed as being limiting in any way.

From operation 604, the method 600 can proceed to operation 606. At operation 606, the server computer 112 can determine if a current number of kernel common language location identifiers exceeds the number of routing areas set in operation 602. If the current number of kernel common language location identifiers does not exceed the number of routing areas, the method 600 can proceed to operation 608.

From operation 606, the method 600 can proceed to operation 608. At operation 608, the server computer 112 can generate a uniformly distributed sequence point within the bounding box. As noted above, the uniformly distributed sequence point can be generated using various approaches including, but not limited to, a sequence of random points; a Sobol sequence of points; a Latins square design sequence of points; a randomized block design; other designs, or the like. As can be appreciated with reference to FIG. 5, a uniformly distributed sequence point generated in operation 608 may be generated in a white space of the area of interest, in a common language location identifier within the area of interest, or the like.

From operation 608, the method 600 can proceed to operation 610. At operation 610, the server computer 112 can determine if the uniformly distributed sequence point generated in operation 608 is within a common language location identifier that was included in the list of common language location identifiers obtained in operation 602. If the server computer 112 determines, in operation 610, that the uniformly distributed sequence point previously generated in operation 608 does not belong to a common language location identifier included in the list of common language location identifiers obtained in operation 602, the method 600 can return to operation 608 and a new uniformly distributed sequence point can be generated. Thus, it can be appreciated that operations 608-610 can be iterated until the server computer 112 determines, in any iteration of operation 610, that the uniformly distributed sequence point generated in operation 608 is within an existing common language location identifier.

If the server computer 112 determines, in any iteration of operation 610, that the uniformly distributed sequence point generated in operation 608 belongs to a common language location identifier included in the list of common language location identifiers obtained in operation 602, the method 600 can proceed to operation 612. At operation 612, the server computer 112 can save the uniformly distributed sequence point generated in operation 608 as a kernel common language location identifier. From operation 612, the method can proceed to operation 614. At operation 614, the server computer 112 can increment the number of kernel common language location identifiers by one and flow can then return to operation 606. Operations 606-614 can be iterated until the server computer 112 determines, in any iteration of operation 606, that a number of common language location identifiers exceeds the number of routing areas.

If the server computer 112 determines, in operation 606, that the number of common language location identifiers exceeds the number of routing areas, the method 600 can proceed to operation 616. At operation 616, the server computer 112 can output the list of kernel common language location identifiers determined in the one or more iterations of operations 606-614. As will be explained in more detail below, the geo configuration can be optimized around the identified kernel common language location identifiers in various embodiments of the concepts and technologies disclosed herein. It should be understood that this example is illustrative, and therefore should not be construed as being limiting in any way.

From operation 616, the method 600 can proceed to operation 618. The method 600 can end at operation 618.

Figure 7:
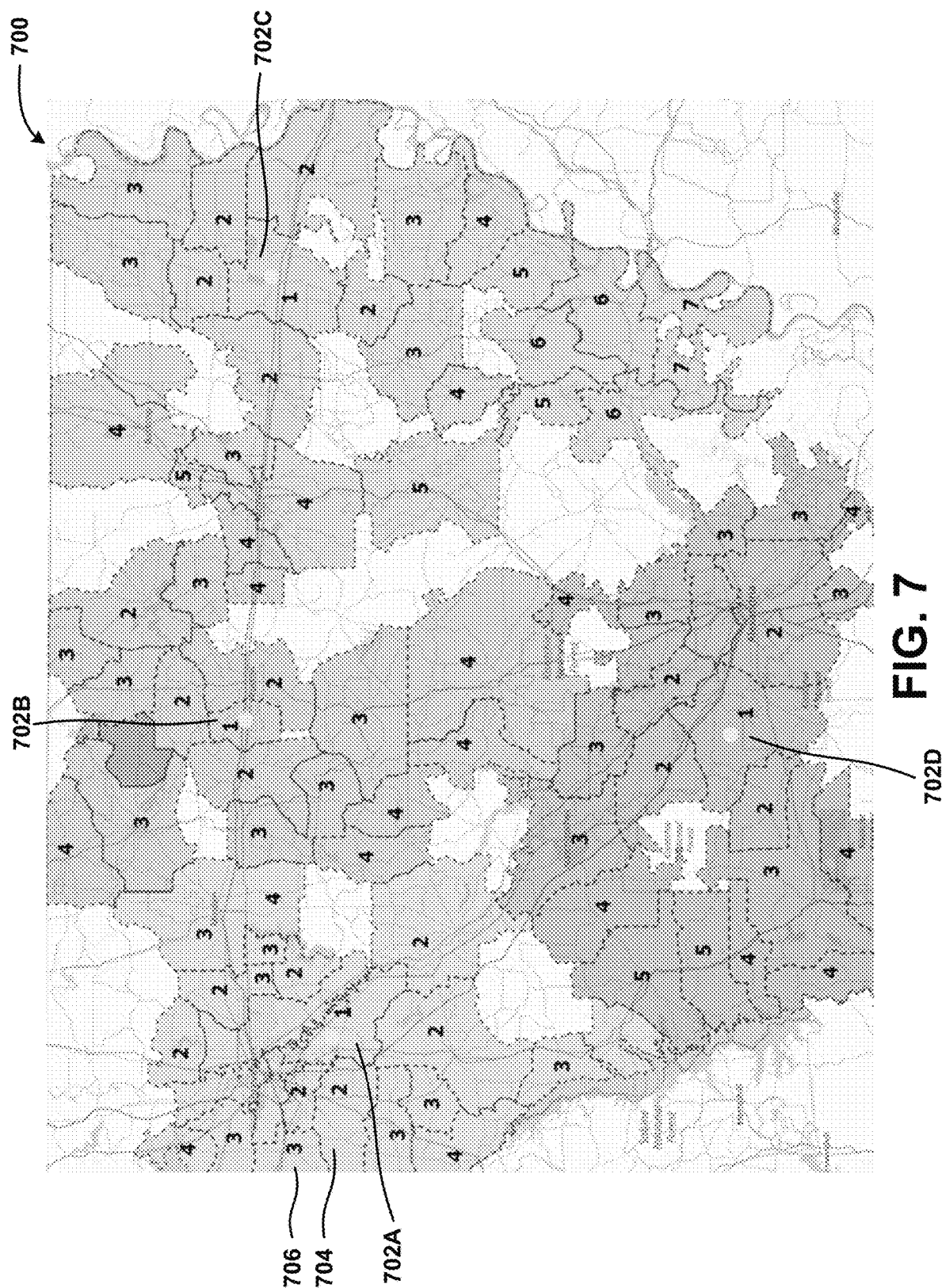
FIG. 7 is a line drawing illustrating additional aspects of some embodiments of the concepts and technologies disclosed herein.

Turning now to FIG. 7, additional aspects of optimizing a configuration will be illustrated and described in more detail, according to an example embodiment of the concepts and technologies disclosed herein. In particular, FIG. 7 is a map display that shows four kernel common language location identifiers 702A-D (hereinafter collectively and/or generically referred to as "kernel common language location identifiers 702") that may have been designated by way of an embodiment of the method 600 illustrated and described above with reference to FIG. 6 (and as explained with reference to FIG. 5). The four kernel common language location identifiers shown in FIG. 7 can correspond to the common language location identifiers that encompass the intersecting points 504 as illustrated and described above with reference to FIG. 5 in this example embodiment. It should be understood that this example is illustrative, and therefore should not be construed as being limiting in any way.

As shown in FIG. 7, a next stage of the optimization can include identifying neighboring common language location identifiers based on the order to which the respective common language location identifiers border the kernel common language location identifiers 702. For example, the second-order neighboring common language location identifier 704 can be designated as a second-order neighboring common language location identifier and labeled with a "2" as this common language location identifier 704 shares a border with the kernel common language location identifier 702A. Some or all neighboring common language location identifiers for a kernel common language location identifier 702 can be designated as second-order neighboring common language location identifiers and labeled with a "2" in the example illustrated in FIG. 7. Thus, it can be appreciated with reference to FIG. 7 that the kernel common language location identifier 702A has multiple second-order neighboring common language location identifiers including the common language location identifier 704. In the next state of the optimization, the second order neighboring common language location identifiers can be appended to the kernel common language location identifiers 702 for each routing area, and third-order neighboring common language location identifiers can be identified as those common language location identifiers that share a border with a second-order neighboring common language location identifier and labeled with a "3."

The routing areas can each be grown in this manner (e.g., by identifying a k-order neighbor, where k begins with 2 and adding those common language location identifiers to the routing area that includes the kernel common language location identifier 702 from which the neighbor relationship is measured). This process can continue until all common language location identifiers are assigned to a routing area with a kernel common language location identifier 702. If a common language location identifier can be assigned to two routing areas, then the routing area that grants to that common language location identifier a lowest-order relationship to the kernel common language location identifier 702 (e.g., if the common language location identifier would be a fourth-order neighboring common language location identifier for a first kernel common language location identifier 702 and a fifth-order neighboring common language location identifier for a second kernel common language location identifier 702 the common language location identifier would be assigned to the routing area that includes the first kernel common language location identifier 702). It should be understood that this example is illustrative, and therefore should not be construed as being limiting in any way.

Thus, it can be appreciated that the routing areas in FIG. 7 can be computed using neighbor relationships between common language location identifiers and kernel common language location identifiers, and that the identification of the kernel common language location identifiers can be based on a randomly generated uniformly distributed sequence point as illustrated and described herein. Thus, the example geo configuration illustrated in FIG. 7 can effectively be randomly generated. It should be understood that this example is illustrative, and therefore should not be construed as being limiting in any way.

Figure 8:
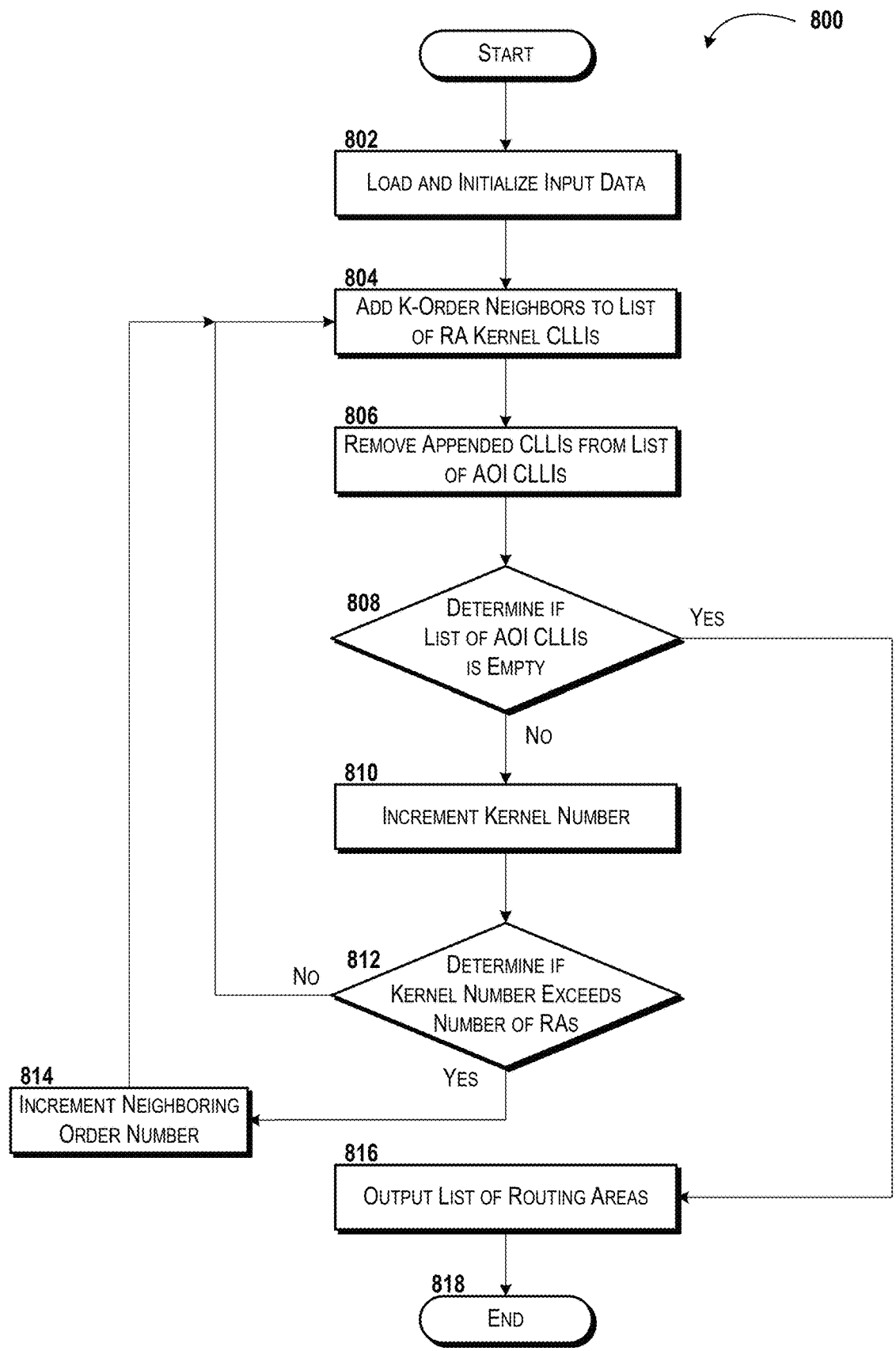
FIG. 8 is a flow diagram showing aspects of a method for appending neighboring common language location identifiers in an area of interest to the kernel common language location identifiers for the area of interest, according to an illustrative embodiment of the concepts and technologies described herein.

Turning now to FIG. 8, aspects of a method 800 for appending neighboring common language location identifiers in an area of interest to the kernel common language location identifiers for the area of interest will be described in detail, according to an illustrative embodiment. For purposes of the method 800, the following definitions for defining neighbor relationships for and/or among common language location identifiers are used: 1) two common language location identifiers can be considered as neighboring common language location identifiers if they have a common boundary; 2) a first common language location identifier is a neighbor of the second order to a second common language location identifier if these two common language location identifiers have a common boundary; 3) a first common language location identifier is a neighbor of a third order to a kernel common language location identifier if the first common language location identifier shares a common boundary with a second order common language location identifier; and 4) a first common language location identifier is a neighbor of the nth order to a kernel common language location identifier if the first common language location identifier shares a common boundary with a second common language location identifier that is a neighbor of (n−1)-order that has a common boundary with the first common language location identifier; and any common language location identifier is a neighbor of the first order to itself. Also, because driving time is one key performance indicator to minimize, only neighboring common language location identifiers are considered to be candidates for inclusion within a same routing area. It should be understood that this example is illustrative, and therefore should not be construed as being limiting in any way.

The method 800 begins at operation 802. At operation 802, the server computer 112 can load and initialize input data. Among the data obtained in operation 802 is a complete list of all common language location identifiers for an area of interest being considered during execution of the method 800. Also loaded in operation 802 is a list of kernel common language location identifiers (e.g., the list of kernel common language location identifiers output in operation 616 of the method 600 illustrated and described above with reference to FIG. 6). Because the list of kernel common language location identifiers can be obtained in additional and/or alternative manners, it should be understood that this example is illustrative, and therefore should not be construed as being limiting in any way.

In operation 802, a number of routing areas being created in the operation of the method 800 can be determined (e.g., from user input, from configurations, from settings, or otherwise). Also, operation 802 can include setting a variable (e.g., k or the like) to a value of two, and a variable (e.g., n or the like) to a value of one. The variable k can correspond to a neighbor order in various embodiments, and the variable n can correspond to a kernel common language location identifier being considered in various embodiments. Thus, operation 802 can include setting the kernel common language location identifier number to one and the neighbor order to two to identify second-order neighbors for the first kernel common language location identifier in various embodiments. Because other values and/or variables can be used and/or initialized in operation 802, it should be understood that these examples are illustrative, and therefore should not be construed as being limiting in any way.

From operation 802, the method 800 can proceed to operation 804. At operation 804, the server computer 112 can add any k-order neighboring common language location identifiers to the nth kernel common language location identifier being considered. As noted above, in a first example embodiment operation 804 can correspond to identifying all second-order neighboring common language location identifiers to a routing area, including the first kernel common language location identifier. It should be understood that this example is illustrative, and therefore should not be construed as being limiting in any way.

From operation 804, the method 800 can proceed to operation 806. At operation 806, the server computer 112 can identify the neighboring common language location identifiers added to the routing area associated with the nth kernel common language location identifier in operation 804 and remove those neighboring common language location identifiers from the list of all common language location identifiers for the area of interest. Thus, operation 806 can help ensure that common language location identifiers are not assigned to multiple routing areas in various embodiments. It should be understood that this example is illustrative, and therefore should not be construed as being limiting in any way.

From operation 806, the method 800 can proceed to operation 808. At operation 808, the server computer 112 can determine if the list of common language location identifiers is empty, e.g., if all common language location identifiers have been assigned to a routing area. If the server computer 112 determines that the list of common language location identifiers is not empty (e.g., that all common language location identifiers have not yet been assigned to a routing area), the method 800 can proceed to operation 810.

At operation 810, the server computer 112 can increment a kernel number (e.g., n=n+1) so that a next kernel common language location identifier can be selected and/or analyzed. From operation 810, the method 800 can proceed to operation 812. At operation 812, the server computer 112 can determine if a kernel number (e.g., n) exceeds a number of routing areas to be created. Thus, operation 812 can correspond to determining if all routing areas have been created. If the server computer 112 determines in operation 812 that the kernel number does not exceed the number of routing areas, the method 800 can return to operation 804, and the server computer 112 can add the k-order neighboring common language location identifiers to a next kernel common language location identifier. It should be understood that this example is illustrative, and therefore should not be construed as being limiting in any way.

If the server computer 112 determines, in any iteration of operation 812, that the kernel number (e.g., n) exceeds a number of routing areas to be created, the method 800 can proceed to operation 814. At operation 814, the server computer 112 can increment a neighboring order number (e.g., k), for example k=k+1, and decrement the kernel number (n=n−1). Flow of the method 800 can then return to operation 804, and the incremented k-order neighbors can be added to the nth kernel common language location identifier. Thus, it should be appreciated that operations 804-814 can be iterated until the server computer 112 determines, in any iteration of operation 808, that the list of area of interest common language location identifiers is empty, e.g., that all common language location identifiers have been assigned to a routing area. It should be understood that this example is illustrative, and therefore should not be construed as being limiting in any way.

If the server computer 112 determines, in any iteration of operation 808, that the list of area of interest common language location identifiers is empty, e.g., that all common language location identifiers have been assigned to a routing area, the method 800 can flow to operation 816. At operation 816, the server computer 112 can output a list of routing areas and the common language location identifiers associated with each of the routing areas. From operation 816 the method 800 can proceed to operation 818. The method 800 can end at operation 818.

In various embodiments of the concepts and technologies disclosed herein, the method 800 can be iterated in additional and/or alternative manners. For example, all k-order neighboring common language location identifiers around a kernel common language location identifier can be found in various ways such as, for example, 1) randomly selecting one of the k-order neighboring common language location identifiers; 2) randomly selecting a subset of k-order neighboring common language location identifiers, or 3) selecting all k-order neighboring common language location identifiers; and adding the selected neighboring common language location identifiers to the kernel common language location identifier; and removing the appended common language location identifiers from the list of common language location identifiers for the area of interest to prevent double use/assignment of the common language location identifiers. It is possible, in some embodiments, that one or more common language location identifiers from the list of common language location identifiers for the area of interest will not be added to any routing area because the one or more common language location identifiers may not share a boundary with any other common language location identifiers. In such a case, this common language location identifier can be treated as its own routing area and removed from the list of common language location identifiers for the area of interest. As such, method 800 will be complete when all common language location identifiers from the list obtained in operation 802 have been assigned to a routing area. Upon completion of the method 800, a new geo configuration has been created. This new geo configuration can be used or evaluated as will be explained in more detail below. It should be understood that this example is illustrative, and therefore should not be construed as being limiting in any way.

Figure 9:
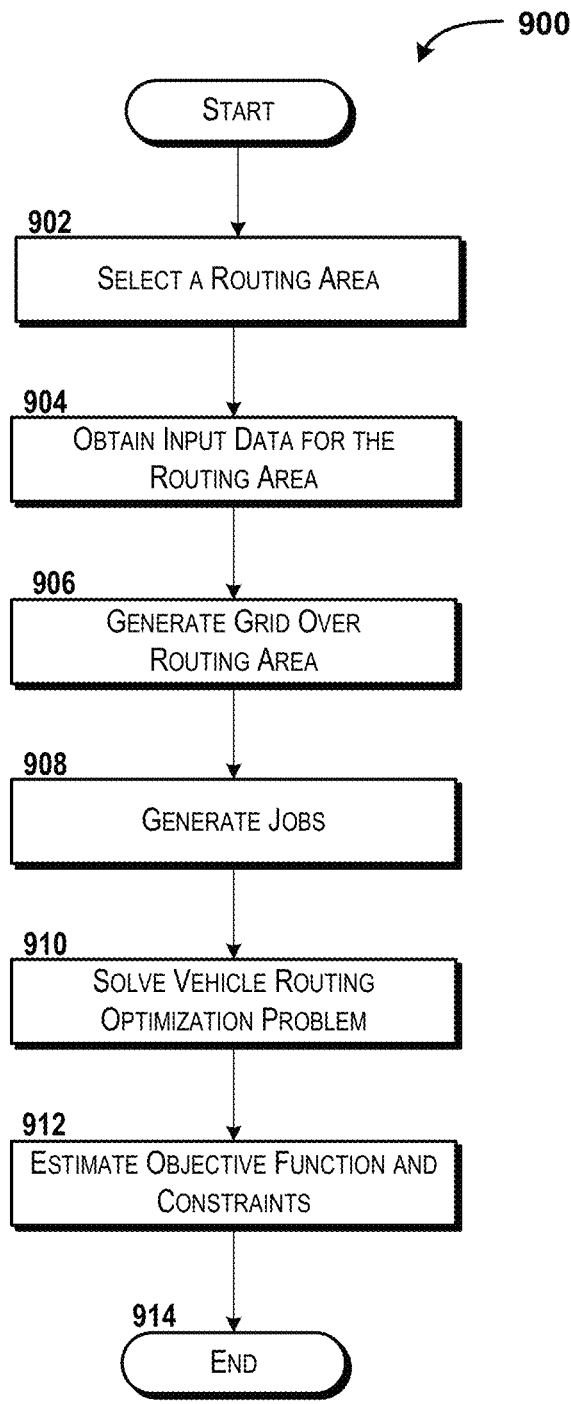
FIG. 9 is a flow diagram showing aspects of a method for evaluating a new geo configuration using a simulation model, according to an illustrative embodiment of the concepts and technologies described herein.

Turning now to FIG. 9, aspects of a method 900 for evaluating a new geo configuration using a simulation model will be described in detail, according to an illustrative embodiment. According to some embodiments of the concepts and technologies disclosed herein, the simulation model illustrated and described herein can be used to simulate a number of jobs, a number of technicians, driving distances between customers, job durations, job locations, job time windows, and the like, to evaluate performance of a new geo configuration generated by embodiments of the concepts and technologies disclosed herein (e.g., by execution, in some embodiments, of the method 800 or other methodologies).

In some embodiments of the concepts and technologies disclosed herein, the simulation model can use an optimization algorithm such as, for example, an optimization algorithm library OptaPlanner to solve a vehicle routing problem to identify an optimal route from a first customer to a second customer, from the second customer to a third customer, etc. Additionally, or alternatively, a spatial analysis problem can be optimized using python package geopandas, which can be used to provide a convenient application programming interface in some embodiments. In various embodiments of the concepts and technologies disclosed herein, the simulation model can be intended to simulate a routing area, with a grid covering the routing area and randomly generating jobs within the routing area. In some embodiments, a two by two kilometer grid is used to guarantee two kilometers accuracy for spatial estimations.

Minimum and maximum numbers of technicians and numbers of jobs can be based on historical data for the geographical region, in some embodiments. Job start time and duration also can be based on limits for a typical work schedule for technicians. Thus, the simulation model illustrated and described herein can randomly generate realistic values, which can then be used as input parameters for the vehicle routing problem solver. It should be understood that this example is illustrative, and therefore should not be construed as being limiting in any way. Furthermore, vehicle routing problem solutions can be used to estimate the key performance indicators to use in finding the optimal geo configuration of the area of interest. Several key performance parameters can be estimated based on the simulation model including, but not limited to, average driving distance, the number of jobs completed, hours per completion, overtime, total cost, etc. Any of these and/or a combination of a few key performance parameters (and/or functions of two or more key performance parameters) can be used as objectives to optimize the geo configuration in some embodiments. It should be understood that this example is illustrative, and therefore should not be construed as being limiting in any way.

The vehicle routing problem solution also can provide several parameters that can be used as key performance parameters such as, for example, number of jobs completed, number of jobs per technician, total driving distance, total driving time, idle time, or the like. Based on this and/or other information, key performance parameters such as hours per completion, overtime, total cost, or the like can be estimated. The simulation model can be referred to a key performance indicator being a function of the routing area; or as a simulation model. One of key performance indicators can be used as an objective function for spatial optimization, with other key performance indicators being used as optimization constraints. A basic flow is illustrated and described for understanding how the simulation model functions according to one example embodiment. It should be understood that this example is illustrative, and therefore should not be construed as being limiting in any way.

The method 900 begins at operation 902. At operation 902, the server computer 112 can select a routing area to evaluate. From operation 902, the method 900 can proceed to operation 904. At operation 904, the server computer 112 can obtain input data for the routing area (to use for the simulation). Thus, operation 904 can include the server computer 112 obtaining supply parameters (e.g., a number of technicians, vehicles, worker hours, etc.) available and demand parameters (e.g., job counts, time for each job, etc.) for the routing area. These input data are loaded to the simulation model as input data.

From operation 904, the method 900 can proceed to operation 906. At operation 906, the server computer 112 can generate a two by two kilometer grid over the routing area territory to attempt to ensure a required accuracy for each technician. It should be understood that this example is illustrative, and therefore should not be construed as being limiting in any way.

From operation 906, the method 900 can proceed to operation 908. At operation 908, the server computer 112 can generate a job. The job generated in operation 908 can include a job location on the grid generated in operation 906, where the job location can be randomly generated in various embodiments. The job generated in operation 908 also can include a job start time and job duration, both of which also can be randomly generated in various embodiments.

From operation 908, the method 900 can proceed to operation 910. At operation 910, the server computer 112 can solve an optimization problem for the job generated in operation 908. In various embodiments of the concepts and technologies disclosed herein, the optimization problem can be solved using an OptaPlanner optimization algorithm. It should be understood that this example is illustrative, and therefore should not be construed as being limiting in any way.

From operation 910, the method 900 can proceed to operation 912. At operation 912, the server computer 112 can estimate and evaluate objective function and optimization constraints to determine how the geo configuration performs. Thus, embodiments of the concepts and technologies disclosed herein can use the simulation model illustrated and described herein to evaluate generated geo configurations and comparisons can be made based, among other things, the objective function and constraints determined for the various geo configurations, as will be discussed below with reference to FIG. 10. It should be understood that this example is illustrative, and therefore should not be construed as being limiting in any way.

From operation 912, the method 900 can proceed to operation 914. The method 900 can end at operation 914.

Figure 10:
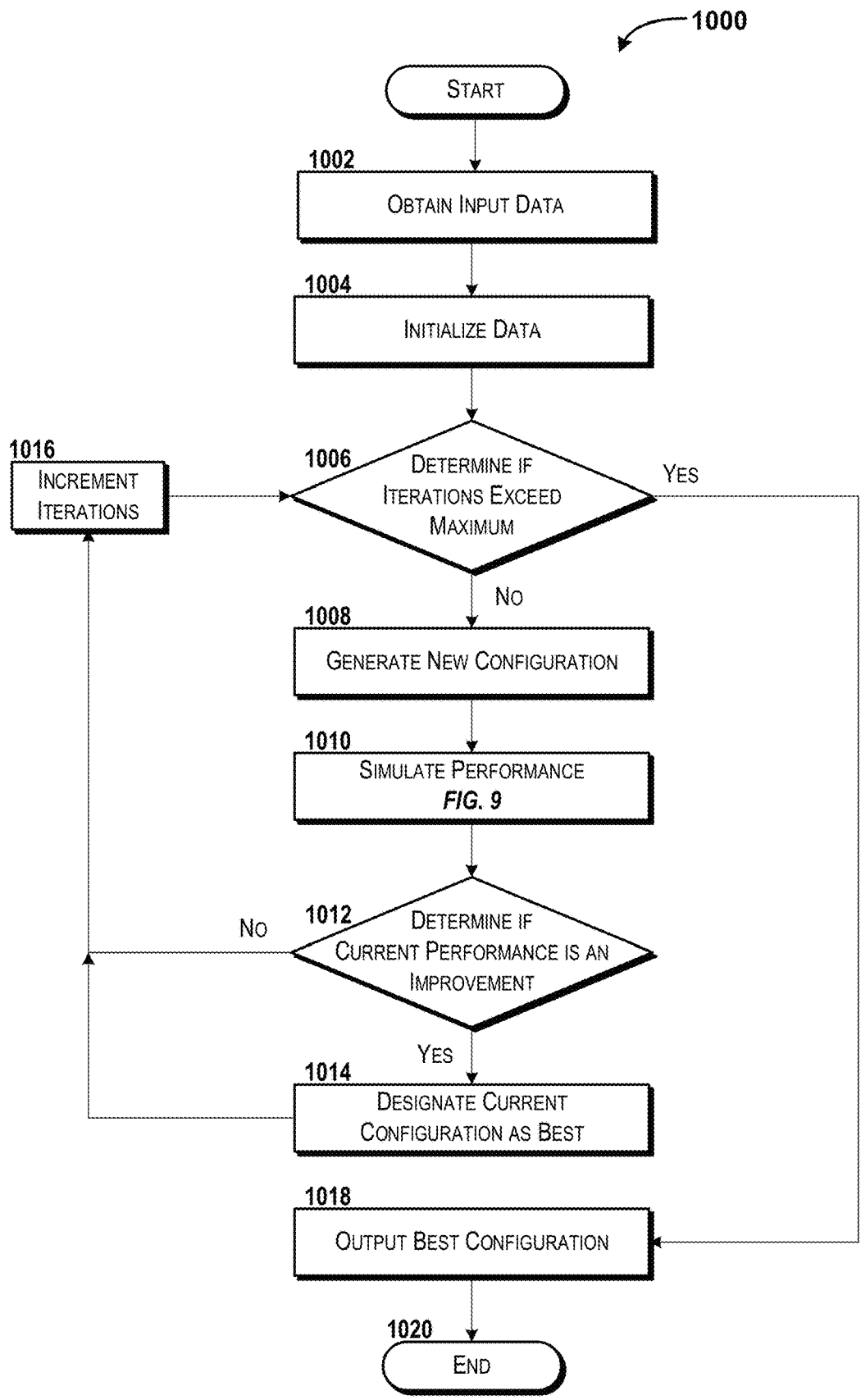
FIG. 10 is a flow diagram showing aspects of a method for optimizing a configuration of routing areas in an area of interest, according to an illustrative embodiment of the concepts and technologies described herein.

Turning now to FIG. 10, aspects of a method 1000 for optimizing a configuration of routing areas in an area of interest will be described in detail, according to an illustrative embodiment. It can be appreciated that the method 1000 shown in FIG. 10 can be substantially similar to the method 300 shown in FIG. 3, but instead of estimating performance of a new configuration the performance can be evaluated by simulation. It should be understood that this example is illustrative, and therefore should not be construed as being limiting in any way.

The method 1000 begins at operation 1002. At operation 1002, the server computer 112 can obtain input data such as, for example, the network data 118. According to various embodiments of the concepts and technologies disclosed herein, the input data (e.g., the network data 118) obtained in operation 1002 can include a list of common language location identifiers included in a given area of interest and a required number of routing areas. It can be appreciated that a device that calls the functionality of the optimization service 110 and/or that submits a request to the optimization service 110 (and/or the server computer 112 that hosts and/or executes the optimization service 110) may identify the area of interest, the number of routing areas, and/or the common language location identifiers included in the area of interest. In some embodiments, the request or service call may only identify the area of interest. In yet other embodiments, the request or service call may identify the number of routing areas and the area of interest. Because the input data obtained in operation 1002 can include additional and/or alternative information and/or data, it should be understood that these examples are illustrative, and therefore should not be construed as being limiting in any way.

From operation 1002, the method 1000 can proceed to operation 1004. At operation 1004, the server computer 112 can load a baseline configuration, designate the baseline configuration as the "best configuration," and set a maximum number of iterations for the optimization being performed in operation 1004 as explained above. As noted above, operation 1004 also can include setting a maximum number of iterations for the method 1000. Operation 1004 also can include a data initialization process. For example, the current number of iterations can be set to "0" in operation 1004 and the current configuration can be loaded as noted above. Additionally, the key performance indicators for the baseline configuration can be obtained and/or calculated (e.g., driving time, ticket resolution time, etc.) and/or estimated, and an objective function value for the baseline configuration can be calculated or estimated. It should be understood that this example is illustrative, and therefore should not be construed as being limiting in any way.

From operation 1004, the method 1000 can proceed to operation 1006. At operation 1006, the server computer 112 can determine if a number of iterations exceeds a maximum number of iterations as explained above. If the server computer 112 determines, in operation 1006, that the maximum number of iterations has not been exceeded, the method 1000 can proceed to operation 1008. At operation 1008, the server computer 112 can randomly generate a new geo configuration for the area of interest.

From operation 1008, the method 1000 can proceed to operation 1010. At operation 1010, the server computer 112 can simulate the performance of the new configuration randomly generated in operation 1008 by using the simulation model illustrated and described above with reference to FIG. 9. The server computer 112 can calculate the performance using (and optimizing) one, two or more, and/or all key performance indicators (e.g., one or more of driving time, time to ticket resolution, delay to ticket action, etc.) for the new configuration. It should be understood that this example is illustrative, and therefore should not be construed as being limiting in any way.

From operation 1010, the method 1000 can proceed to operation 1012. At operation 1012, the server computer 112 can determine if the objective function determined in operation 1010 is better than the objective function value of the current configuration. If the server computer 112 determines that the simulated objective function is better than the objective function calculated for the previously-used geo configuration, the server computer 112 can determine that the new configuration randomly generated in operation 1008 is better than the previously used configuration and flow of the method 1000 can proceed to operation 1014. At operation 1014, the server computer 112 can designate the new configuration generated in operation 1008 as the "best configuration" to be used in a future iteration. It should be understood that this example is illustrative, and therefore should not be construed as being limiting in any way.

From operation 1014, the method 1000 can proceed to operation 1016. The method 1000 also can proceed to operation 1016 if the server computer 112 determines, in operation 1012, that the new configuration is not an improvement over the previously used configuration (in which case, the configuration generated in operation 1008 can be discarded or disregarded and the previously-used configuration can be maintained). At operation 1016, the server computer 112 can iterate the number of iterations and the method 1000 can flow back to operation 1006. Thus, it can be appreciated that operations 1006-1016 can be iterated until the server computer 112 determines, in any iteration of operation 1006, that the current number of iterations exceeds a maximum number of iterations. If the server computer 112 determines, in any iteration of operation 1006, that the maximum number of iterations has been exceeded, the method 1000 proceeds to operation 1018.

At operation 1018, the server computer 112 can output the best configuration for the area of interest. By way of example, if the server computer 112 never determined (in any iteration of operation 1012) that the new configuration being considered was an improvement over the baseline configuration (designated as the best configuration in operation 1004), the server computer 112 can output the baseline configuration in operation 1018. Otherwise, the server computer 112 can output, in operation 1018, the best configuration evaluated in the one or more iterations of operations 1006-1016. Thus, operation 1018 can result in the output of an optimized geo configuration for the area of interest. It should be understood that this example is illustrative, and therefore should not be construed as being limiting in any way.

From operation 1018, the method 1000 can proceed to operation 1020. The method 1000 can end at operation 1020. Thus, the method 1000 can be used to 1) solve a vehicle routing optimization problem for each geo configuration generated randomly, and 2) find a best geo configuration that can minimize the objective function and satisfy constraints. It should be understood that FIG. 10 illustrates a simplified version of a combinatorial optimization algorithm to illustrate the concepts and technologies disclosed herein. It should be understood, however, that any combinatorial algorithm can be used in accordance with various embodiments of the concepts and technologies disclosed herein. It should be understood that this example is illustrative, and therefore should not be construed as being limiting in any way.

According to various embodiments of the method 1000, the input data obtained in operation 1002 can include a full list of common language location identifiers contained in a given area of interest; a number of required routing areas, a maximum allowable number of iterations, and a baseline configuration, which can include a current geo configuration implemented in real life. The baseline configuration may be improved with respect to one or more key performance indicator values. It should be understood that this example is illustrative, and therefore should not be construed as being limiting in any way.

The geo configuration mentioned herein can include a three-level geographical structure associated with an area of interest, which can determine a number (e.g., N) routing areas and a list of common language location identifiers included in each of the N routing areas, where N can be a required number of routing areas in a given AOI. Input data for geo design can include a list of common language location identifiers included in a given AOI and a required number (N) of RAs. Each common language location identifier can be represented by a unique ID and geo boundaries. A desired outcome of the optimization is to find a solution to the question of how to split the list of common language location identifiers into N sub-lists, where each sub-list can represent a routing area.

It should be noted that estimation of key performance indicators as illustrated and described herein can include 1) calculating key performance indicators for each routing area in the geo sub-region; and 2) aggregating all key performance indicators and calculating them for the entire sub-region. In some embodiments, aggregation can help because a set of routing areas can be different for each geo configuration. As such, comparing key performance indicator values on the routing area level may not be possible. Thus, aggregation can provide key performance indicator values on the area of interest level, which can be the same for some combination of CLLIs into different sets of routing areas. This therefore can allow a comparison between key performance indicator values for different geo configurations, which may be used to find an optimal geo configuration.

Furthermore, it should be understood that use of a baseline configuration can allow comparing new geo configurations with current implementations. In a worst-case scenario, new key performance indicators can be worse than a baseline key performance indicator, thereby indicating that implementing the new geo configuration is not advisable and/or would serve no purpose. In such a case, the optimization should continue until a better solution is found. Also, comparison with baseline key performance indicators can allow seeing what performance level should be expected if a suggested geo configuration will be implemented in the field. It should be understood that this example is illustrative, and therefore should not be construed as being limiting in any way.

Figure 11:
FIG. 11 is a line drawing illustrating additional aspects of some embodiments of the concepts and technologies disclosed herein.

Turning now to FIG. 11, an example implementation and/or use case of the concepts and technologies disclosed herein is described in detail. It should be understood that this example is illustrative, and therefore should not be construed as being limiting in any way. Many companies in the United States may deliver goods or services to customers and may create multi-layered distribution networks for the delivery of such goods and services. Such companies may map regional sales territories and sales districts using ZIP codes and/or other designations. Each zip code service area may have a permanent boundary that can be represented by a polygon. Therefore, embodiment of the concepts and technologies disclosed herein may be used in a similar manner to optimize such implementations. An example implementation in FIG. 11 is now described.

FIG. 11 shows a map 1100. The map 1100 can represent a first territory 1102, which is illustrated as including ten ZIP codes; a second territory 1104 that can include fifteen ZIP codes; a third territory 1106, which can include thirteen ZIP codes; and so on. Each of the territories (e.g., the first territory 1102, the second territory 1104, the third territory 1106, etc.) can be served by a single sales team and/or controlled by a sales manager. It should be understood that this example is illustrative, and therefore should not be construed as being limiting in any way. An entity (e.g., a company) providing services or goods to customers in the territories may do so via a similar hierarchy to that illustrated and described herein, e.g., cities, territories, ZIP codes. As such, it can be appreciated that the proposed geo configuration optimization technologies illustrated and described herein can be used to optimize placement of various types of resources within a geographic area and may be useful to various types of companies for territory optimization, e.g., by companies such as Amazon, UPS, FedEx, USPS, etc. It should be understood that this example is illustrative, and therefore should not be construed as being limiting in any way.

Figure 12:
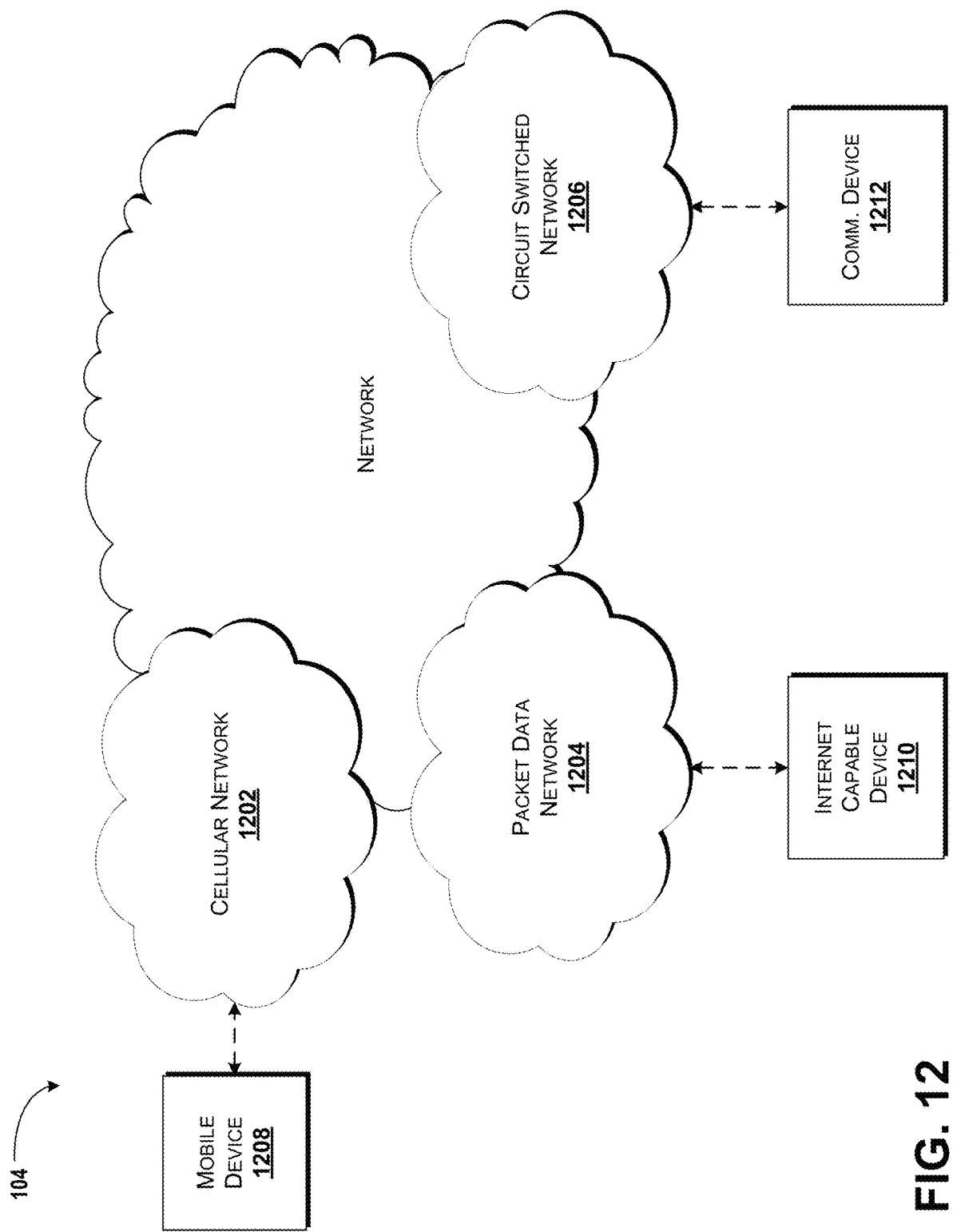
FIG. 12 schematically illustrates a network, according to an illustrative embodiment of the concepts and technologies described herein.

Turning now to FIG. 12, additional details of the network 104 are illustrated, according to an illustrative embodiment. The network 104 includes a cellular network 1202, a packet data network 1204, for example, the Internet, and a circuit switched network 1206, for example, a publicly switched telephone network ("PSTN"). The cellular network 1202 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 1202 also includes radios and nodes for receiving and transmitting voice, data, and combinations thereof to and from radio transceivers, networks, the packet data network 1204, and the circuit switched network 1206.

A mobile communications device 1208, such as, for example, a cellular telephone, a user equipment, a mobile terminal, a PDA, a laptop computer, a handheld computer, and combinations thereof, can be operatively connected to the cellular network 1202. The cellular network 1202 can be configured as a 2G GSM network and can provide data communications via GPRS and/or EDGE. Additionally, or alternatively, the cellular network 1202 can be configured as a 5G UMTS network and can provide data communications via the HSPA protocol family, for example, HSDPA, EUL (also referred to as HSUPA), and HSPA+. The cellular network 1202 also is compatible with 4G mobile communications standards, 5G mobile communications standards, other mobile communications standards, and evolved and future mobile communications standards.

The packet data network 1204 includes various devices, for example, servers, computers, databases, and other devices in communication with one another, as is generally known. The packet data network 1204 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 1204 includes or is in communication with the Internet. The circuit switched network 1206 includes various hardware and software for providing circuit switched communications. The circuit switched network 1206 may include, or may be, what is often referred to as a plain old telephone system (POTS). The functionality of a circuit switched network 1206 or other circuit-switched network are generally known and will not be described herein in detail.

The illustrated cellular network 1202 is shown in communication with the packet data network 1204 and a circuit switched network 1206, though it should be appreciated that this is not necessarily the case. One or more Internet-capable devices 1210, for example, a PC, a laptop, a portable device, or another suitable device, can communicate with one or more cellular networks 1202, and devices connected thereto, through the packet data network 1204. It also should be appreciated that the Internet-capable device 1210 can communicate with the packet data network 1204 through the circuit switched network 1206, the cellular network 1202, and/or via other networks (not illustrated).

As illustrated, a communications device 1212, for example, a telephone, facsimile machine, modem, computer, or the like, can be in communication with the circuit switched network 1206, and therethrough to the packet data network 1204 and/or the cellular network 1202. It should be appreciated that the communications device 1212 can be an Internet-capable device, and can be substantially similar to the Internet-capable device 1210. In the specification, the network 104 is used to refer broadly to any combination of the networks 1202, 1204, 1206. It should be appreciated that substantially all of the functionality described with reference to the network 104 can be performed by the cellular network 1202, the packet data network 1204, and/or the circuit switched network 1206, alone or in combination with other networks, network elements, and the like.

Figure 13:
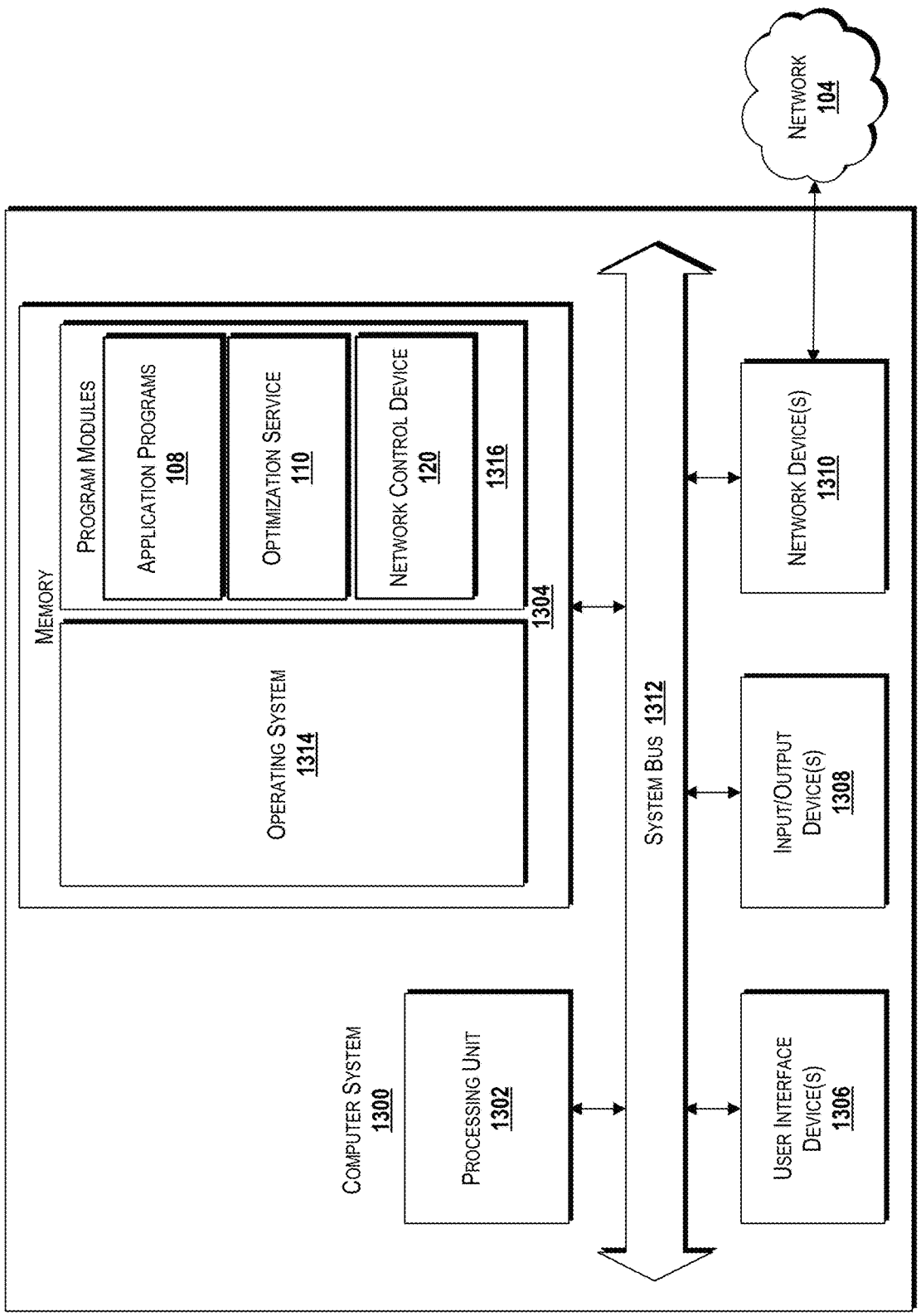
FIG. 13 is a block diagram illustrating an example computer system configured to enable improving configuration of routing areas within an area of interest, according to some illustrative embodiments of the concepts and technologies described herein.

FIG. 13 is a block diagram illustrating a computer system 1300 configured to provide the functionality described herein for improving configuration of routing areas within an area of interest, in accordance with various embodiments of the concepts and technologies disclosed herein. The computer system 1300 includes a processing unit 1302, a memory 1304, one or more user interface devices 1306, one or more input/output ("I/O") devices 1308, and one or more network devices 1310, each of which is operatively connected to a system bus 1312. The bus 1312 enables bi-directional communication between the processing unit 1302, the memory 1304, the user interface devices 1306, the I/O devices 1308, and the network devices 1310.

The processing unit 1302 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 1304 communicates with the processing unit 1302 via the system bus 1312. In some embodiments, the memory 1304 is operatively connected to a memory controller (not shown) that enables communication with the processing unit 1302 via the system bus 1312. The memory 1304 includes an operating system 1314 and one or more program modules 1316. The operating system 1314 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 1316 may include various software and/or program modules described herein. In some embodiments, for example, the program modules 1316 include the application programs 108, the optimization service 110, and/or the network control device 120. These and/or other programs can be embodied in computer-readable media containing instructions that, when executed by the processing unit 1302, perform one or more of the methods 300, 600, 800, 900, and/or 1000 described in detail above with respect to FIGS. 3, 6, 8, 9, and/or 10 and/or other functionality as illustrated and described herein. It can be appreciated that, at least by virtue of the instructions embodying the methods 300, 600, 800, 900, and/or 1000, and/or other functionality illustrated and described herein being stored in the memory 1304 and/or accessed and/or executed by the processing unit 1302, the computer system 1300 is a special-purpose computing system that can facilitate providing the functionality illustrated and described herein. According to embodiments, the program modules 1316 may be embodied in hardware, software, firmware, or any combination thereof. Although not shown in FIG. 13, it should be understood that the memory 1304 also can be configured to store the network data 118, the session data 116, and/or other data, if desired.

By way of example, and not limitation, computer-readable media may include any available computer storage media or communication media that can be accessed by the computer system 1300. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1300. In the claims, the phrase "computer storage medium" and variations thereof does not include waves or signals per se and/or communication media.

The user interface devices 1306 may include one or more devices with which a user accesses the computer system 1300. The user interface devices 1306 may include, but are not limited to, computers, servers, personal digital assistants, cellular phones, or any suitable computing devices. The I/O devices 1308 enable a user to interface with the program modules 1316. In one embodiment, the I/O devices 1308 are operatively connected to an I/O controller (not shown) that enables communication with the processing unit 1302 via the system bus 1312. The I/O devices 1308 may include one or more input devices, such as, but not limited to, a keyboard, a mouse, or an electronic stylus. Further, the I/O devices 1308 may include one or more output devices, such as, but not limited to, a display screen or a printer.

The network devices 1310 enable the computer system 1300 to communicate with other networks or remote systems via a network, such as the network 104. Examples of the network devices 1310 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 14:
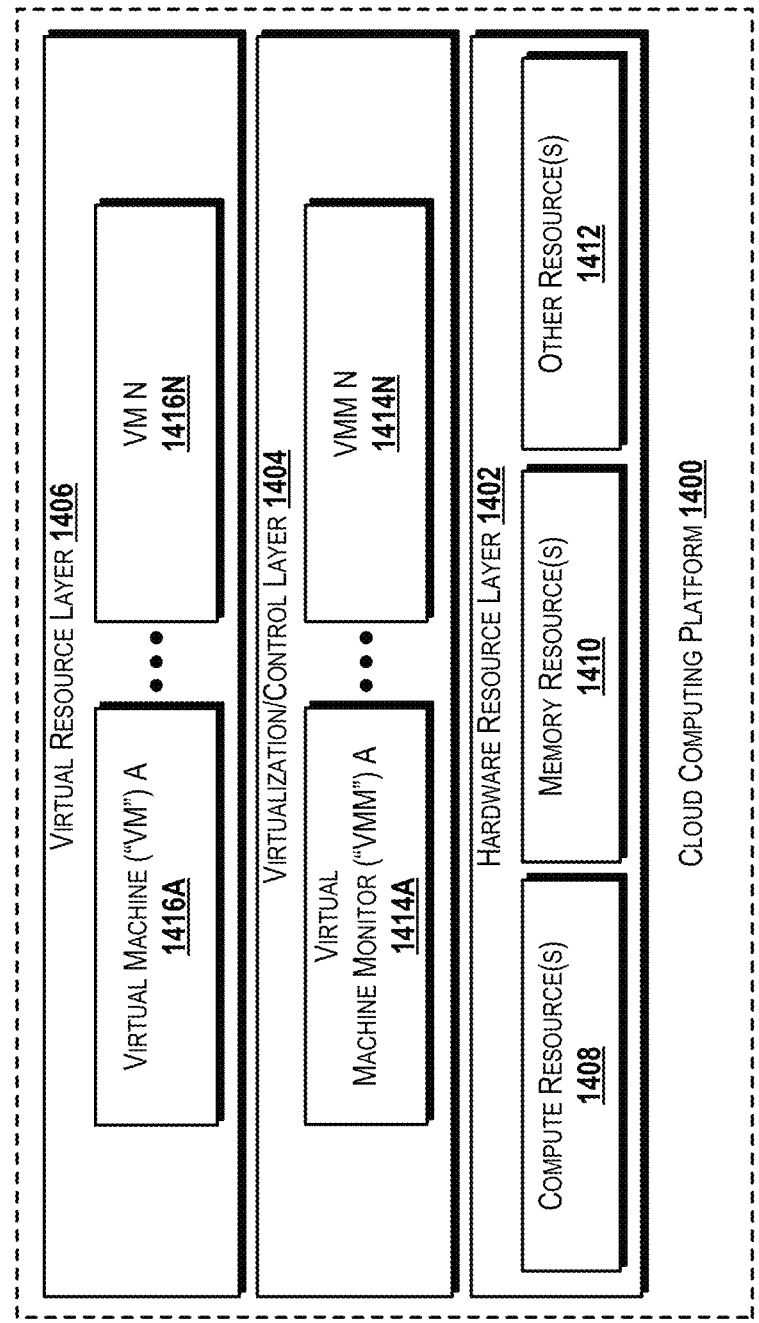
FIG. 14 is a diagram illustrating a computing environment capable of implementing aspects of the concepts and technologies disclosed herein, according to some illustrative embodiments of the concepts and technologies described herein.

FIG. 14 illustrates an illustrative architecture for a cloud computing platform 1400 that can be capable of executing the software components described herein for improving configuration of routing areas within an area of interest and/or for interacting with the application programs 108, the optimization service 110, and/or the network control device 120. Thus, it can be appreciated that in some embodiments of the concepts and technologies disclosed herein, the cloud computing platform 1400 illustrated in FIG. 14 can be used to provide the functionality described herein with respect to the user device 102, the server computer 112, and/or the network control device 120.

The cloud computing platform 1400 thus may be utilized to execute any aspects of the software components presented herein. Thus, according to various embodiments of the concepts and technologies disclosed herein, the application programs 108, the optimization service 110, and/or the network control device 120 can be implemented, at least in part, on or by elements included in the cloud computing platform 1400 illustrated and described herein. Those skilled in the art will appreciate that the illustrated cloud computing platform 1400 is a simplification of but only one possible implementation of an illustrative cloud computing platform, and as such, the illustrated cloud computing platform 1400 should not be construed as being limiting in any way.

In the illustrated embodiment, the cloud computing platform 1400 can include a hardware resource layer 1402, a virtualization/control layer 1404, and a virtual resource layer 1406. These layers and/or other layers can be configured to cooperate with each other and/or other elements of a cloud computing platform 1400 to perform operations as will be described in detail herein. While connections are shown between some of the components illustrated in FIG. 14, it should be understood that some, none, or all of the components illustrated in FIG. 14 can be configured to interact with one another to carry out various functions described herein. In some embodiments, the components are arranged so as to communicate via one or more networks such as, for example, the network 104 illustrated and described hereinabove (not shown in FIG. 14). Thus, it should be understood that FIG. 14 and the following description are intended to provide a general understanding of a suitable environment in which various aspects of embodiments can be implemented and should not be construed as being limiting in any way.

The hardware resource layer 1402 can provide hardware resources. In the illustrated embodiment, the hardware resources can include one or more compute resources 1408, one or more memory resources 1410, and one or more other resources 1412. The compute resource(s) 1408 can include one or more hardware components that can perform computations to process data, and/or to execute computer-executable instructions of one or more application programs, operating systems, services, and/or other software including, but not limited to, the application programs 108, the optimization service 110, and/or the network control device 120 illustrated and described herein.

According to various embodiments, the compute resources 1408 can include one or more central processing units ("CPUs"). The CPUs can be configured with one or more processing cores. In some embodiments, the compute resources 1408 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 1408 can include one or more discrete GPUs. In some other embodiments, the compute resources 1408 can include one or more CPU and/or GPU components that can be configured in accordance with a co-processing CPU/GPU computing model. Thus, it can be appreciated that in some embodiments of the compute resources 1408, a sequential part of an application can execute on a CPU and a computationally-intensive part of the application can be accelerated by the GPU. It should be understood that this example is illustrative, and therefore should not be construed as being limiting in any way.

In some embodiments, the compute resources 1408 also can include one or more system on a chip ("SoC") components. It should be understood that the SoC component can operate in association with one or more other components as illustrated and described herein, for example, one or more of the memory resources 1410 and/or one or more of the other resources 1412. In some embodiments in which an SoC component is included, the compute resources 1408 can be or can include one or more embodiments of the SNAPDRAGON brand family of SoCs, available from QUALCOMM of San Diego, California; one or more embodiment of the TEGRA brand family of SoCs, available from NVIDIA of Santa Clara, California; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Texas; one or more customized versions of any of the above SoCs; and/or one or more other brand and/or one or more proprietary SoCs.

The compute resources 1408 can be or can include one or more hardware components arranged in accordance with an ARM architecture, available for license from ARM HOLDINGS of Cambridge, United Kingdom. Alternatively, the compute resources 1408 can be or can include one or more hardware components arranged in accordance with an x86 architecture, such as an architecture available from INTEL CORPORATION of Mountain View, California, and others. Those skilled in the art will appreciate the implementation of the compute resources 1408 can utilize various computation architectures and/or processing architectures. As such, the various example embodiments of the compute resources 1408 as mentioned hereinabove should not be construed as being limiting in any way. Rather, implementations of embodiments of the concepts and technologies disclosed herein can be implemented using compute resources 1408 having any of the particular computation architecture and/or combination of computation architectures mentioned herein as well as other architectures.

Although not separately illustrated in FIG. 14, it should be understood that the compute resources 1408 illustrated and described herein can host and/or execute various services, applications, portals, and/or other functionality illustrated and described herein. Thus, the compute resources 1408 can host and/or can execute the application programs 108, the optimization service 110, and/or the network control device 120 or other applications or services illustrated and described herein.

The memory resource(s) 1410 can include one or more hardware components that can perform or provide storage operations, including temporary and/or permanent storage operations. In some embodiments, the memory resource(s) 1410 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 1408, subject to the definition of "computer storage media" provided above (e.g., as excluding waves and signals per se and/or communication media as defined in this application).

Although not illustrated in FIG. 14, it should be understood that the memory resources 1410 can host or store the various data illustrated and described herein including, but not limited to, network data 118, the session data 116, and/or other data, if desired. It should be understood that this example is illustrative, and therefore should not be construed as being limiting in any way.

The other resource(s) 1412 can include any other hardware resources that can be utilized by the compute resources (s) 1408 and/or the memory resource(s) 1410 to perform operations. The other resource(s) 1412 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 1402 can be virtualized by one or more virtual machine monitors ("VMMs") 1414A-1414N (also known as "hypervisors;" hereinafter "VMMs 1414"). The VMMs 1414 can operate within the virtualization/control layer 1404 to manage one or more virtual resources that can reside in the virtual resource layer 1406. The VMMs 1414 can be or can include software, firmware, and/or hardware that alone or in combination with other software, firmware, and/or hardware, can manage one or more virtual resources operating within the virtual resource layer 1406.

The virtual resources operating within the virtual resource layer 1406 can include abstractions of at least a portion of the compute resources 1408, the memory resources 1410, the other resources 1412, or any combination thereof. These abstractions are referred to herein as virtual machines ("VMs"). In the illustrated embodiment, the virtual resource layer 1406 includes VMs 1416A-1416N (hereinafter "VMs 1416").

Based on the foregoing, it should be appreciated that systems and methods for improving configuration of routing areas within an area of interest have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
  a processor; and
  a memory that stores computer-executable instructions that, when executed by the processor, cause the processor to perform operations comprising
    obtaining input data comprising a list of common language location identifiers within a defined area of interest and identification of a number of routing areas to be created within the area of interest, wherein a first common language location identifier of the common language location identifiers comprises at least three geographic coordinates that form a first polygon defining first boundaries of the first common language location identifier,
    creating a bounding rectangle around the area of interest represented by the list of common language location identifiers,
    generating, within the bounding rectangle, a uniformly distributed sequence point comprising latitude and longitude coordinates,
    determining, from within the list of common language location identifiers, if the latitude and longitude coordinates associated with the uniformly distributed sequence point are located in the first boundaries of the first common language location identifier,
    if a determination is made that the latitude and longitude coordinates associated with the uniformly distributed sequence point are located within the first boundaries of the first common language location identifier, adding, to a list of kernel common language location identifiers, the first common language location identifier, and
    if a determination is made that the latitude and longitude coordinates associated with the uniformly distributed sequence point are not located in the first boundaries of the first common language location identifier, discarding the uniformly distributed sequence point.

2. The system of claim 1, wherein the latitude and longitude coordinates associated with the uniformly distributed sequence point are generated using a randomly distributed sequence.

3. The system of claim 1, wherein the latitude and longitude coordinates associated with the uniformly distributed sequence point are generated using a Sobol sequence.

4. The system of claim 1, wherein the latitude and longitude coordinates associated with the uniformly distributed sequence point are generated using a Latins square design sequence.

5. The system of claim 1, wherein the latitude and longitude coordinates associated with the uniformly distributed sequence point are generated using a randomized block designs sequence.

6. The system of claim 1, wherein the computer-executable instructions, when executed by the processor, cause the processor to perform operations further comprising:

creating a routing area list for a kernel common language location identifier;
identifying, in the list of common language location identifiers within the defined area of interest, all k-order neighbors for each common language location identifier taken from the given set of kernel common language location identifiers;
appending, based on a neighborhood relationship, identified k-order neighbors to the routing area list for the kernel common language location identifiers;
removing, from the list of common language location identifiers within the defined area of interest, appended common language location identifiers; and
outputting the routing area list of common language location identifiers as a resulting geo configuration.

7. The system of claim 6, wherein the computer-executable instructions, when executed by the processor, cause the processor to perform operations further comprising:
estimating an objective function and constraints based on a simulation model applied to the resulting geo configuration.

8. A method comprising:
obtaining, by a computer comprising a processor, input data comprising a list of common language location identifiers within a defined area of interest and identification of a number of routing areas to be created within the area of interest, wherein a first common language location identifier of the common language location identifiers comprises at least three geographic coordinates that form a first polygon defining first boundaries of the first common language location identifier;
creating, by the processor, a bounding rectangle around the area of interest represented by the list of common language location identifiers;
generating, by the processor and within the bounding rectangle, a uniformly distributed sequence point comprising latitude and longitude coordinates;
determining, by the processor and from within the list of common language location identifiers, if the latitude and longitude coordinates associated with the uniformly distributed sequence point are located in the first boundaries of the first common language location identifier;
if a determination is made that the latitude and longitude coordinates associated with the uniformly distributed sequence point are located within the first boundaries of the first common language location identifier, adding, by the processor and to a list of kernel common language location identifiers, the first common language location identifier; and
if a determination is made that the latitude and longitude coordinates associated with the uniformly distributed sequence point are not located in the first boundaries of the first common language location identifier, discarding, by the processor, the uniformly distributed sequence point.

9. The method of claim 8, wherein the latitude and longitude coordinates associated with the uniformly distributed sequence point are generated using a randomly distributed sequence.

10. The method of claim 8, wherein the latitude and longitude coordinates associated with the uniformly distributed sequence point are generated using a Sobol sequence.

11. The method of claim 8, wherein the latitude and longitude coordinates associated with the uniformly distributed sequence point are generated using a Latins square design sequence.

12. The method of claim 8, wherein the latitude and longitude coordinates associated with the uniformly distributed sequence point are generated using a randomized block designs sequence.

13. The method of claim 8, further comprising:
creating a routing area list for a kernel common language location identifier; identifying, in the list of common language location identifiers within the defined area of interest, all k-order neighbors for each common language location identifier taken from the given set of kernel common language location identifiers;
appending, based on a neighborhood relationship, identified k-order neighbors to the routing area list for the kernel common language location identifiers;
removing, from the list of common language location identifiers within the defined area of interest, appended common language location identifiers; and
outputting the routing area list of common language location identifiers as a resulting geo configuration.

14. The method of claim 13, further comprising:
estimating an objective function and constraints based on a simulation model applied to the resulting geo configuration.

15. A computer storage medium having computer-executable instructions stored thereon that, when executed by a processor, cause the processor to perform operations comprising:
obtaining input data comprising a list of common language location identifiers within a defined area of interest and identification of a number of routing areas to be created within the area of interest, wherein a first common language location identifier of the common language location identifiers comprises at least three geographic coordinates that form a first polygon defining first boundaries of the first common language location identifier;
creating a bounding rectangle around the area of interest represented by the list of common language location identifiers;
generating, within the bounding rectangle, a uniformly distributed sequence point comprising latitude and longitude coordinates;
determining, from within the list of common language location identifiers, if the latitude and longitude coordinates associated with the uniformly distributed sequence point are located in the first boundaries of the first common language location identifier;
if a determination is made that the latitude and longitude coordinates associated with the uniformly distributed sequence point are located within the first boundaries of the first common language location identifier, adding, to a list of kernel common language location identifiers, the first common language location identifier; and
if a determination is made that the latitude and longitude coordinates associated with the uniformly distributed sequence point are not located in the first boundaries of the first common language location identifier, discarding the uniformly distributed sequence point.

16. The computer storage medium of claim 15, wherein the latitude and longitude coordinates associated with the uniformly distributed sequence point are generated using a randomly distributed sequence.

17. The computer storage medium of claim 15, wherein the latitude and longitude coordinates associated with the uniformly distributed sequence point are generated using a Sobol sequence.

18. The computer storage medium of claim 15, wherein the latitude and longitude coordinates associated with the uniformly distributed sequence point are generated using a Latins square design sequence.

19. The computer storage medium of claim 15, wherein the computer-executable instructions, when executed by the processor, cause the processor to perform operations further comprising:
   creating a routing area list for a kernel common language location identifier; identifying, in the list of common language location identifiers within the defined area of interest, all k-order neighbors for each common language location identifier taken from the given set of kernel common language location identifiers;
   appending, based on a neighborhood relationship, identified k-order neighbors to the routing area list for the kernel common language location identifiers;
   removing, from the list of common language location identifiers within the defined area of interest, appended common language location identifiers; and
   outputting the routing area list of common language location identifiers as a resulting geo configuration.

20. The computer storage medium of claim 19, wherein the computer-executable instructions, when executed by the processor, cause the processor to perform operations further comprising:
   estimating an objective function and constraints based on a simulation model applied to the resulting geo configuration.

* * * * *